(12) United States Patent
Seki et al.

(10) Patent No.: US 7,129,967 B2
(45) Date of Patent: Oct. 31, 2006

(54) FREQUENCY MODULATION APPARATUS AND FREQUENCY MODULATION METHOD

(75) Inventors: Yuichi Seki, Saitama (JP); Satoshi Endo, Kanagawa (JP); Atsushi Nakagawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 10/789,997

(22) Filed: Mar. 2, 2004

(65) Prior Publication Data

US 2004/0174428 A1 Sep. 9, 2004

(30) Foreign Application Priority Data

Mar. 3, 2003 (JP) .............................. 2003-055863
Mar. 11, 2003 (JP) .............................. 2003-064996
May 19, 2003 (JP) .............................. 2003-140350

(51) Int. Cl.
*B41J 2/435* (2006.01)
(52) U.S. Cl. .................................... 347/249
(58) Field of Classification Search ........ 347/234–235, 347/248–250; 399/100; 359/278, 287; 358/474, 358/505
See application file for complete search history.

(56) References Cited

U.S. PATENT DOCUMENTS

| 5,822,105 | A | 10/1998 | Kodama et al. ............. 359/201 |
| 5,933,184 | A | 8/1999 | Ishigami et al. ............. 347/249 |
| 6,310,681 | B1 | 10/2001 | Taniwaki ..................... 355/55 |
| 6,560,256 | B1 | 5/2003 | Seki et al. ................ 372/38.02 |
| 2004/0017598 | A1 | 1/2004 | Seki et al. ................... 359/204 |
| 2004/0037585 | A1* | 2/2004 | Ishiguro et al. ............. 399/100 |

FOREIGN PATENT DOCUMENTS

| EP | 1130538 | 9/2001 |
| JP | 2-282763 | 11/1990 |
| JP | 9-174917 | 7/1997 |
| JP | 9-218370 | 8/1997 |
| JP | 11-198435 | 7/1999 |

* cited by examiner

*Primary Examiner*—Hai Pham
(74) *Attorney, Agent, or Firm*—Fitzpatrick, Cella, Harper & Scinto

(57) ABSTRACT

Disclosed are a frequency modulation apparatus and a frequency modulation method for generating an image clock that is used for turning on/off a laser beam that scans an image bearing member, such as a photosensitive drum. The frequency modulation apparatus divides, into a plurality of segments for each pixel, a main scan line on an image bearing member, and calculates auxiliary clock periods based on a reference clock period and variable-magnification coefficients corresponding to the segments. Then, the frequency modulation apparatus generates image clocks for the respective segments based on an initial predesignated period value and the obtained auxiliary clock periods. Furthermore, the frequency modulation apparatus includes a detecting device for detecting a difference between a reference value stored in a memory and an actual laser irradiation location, and corrects a shift in the laser irradiation location in accordance with the detection results obtained by the detecting device.

5 Claims, 23 Drawing Sheets

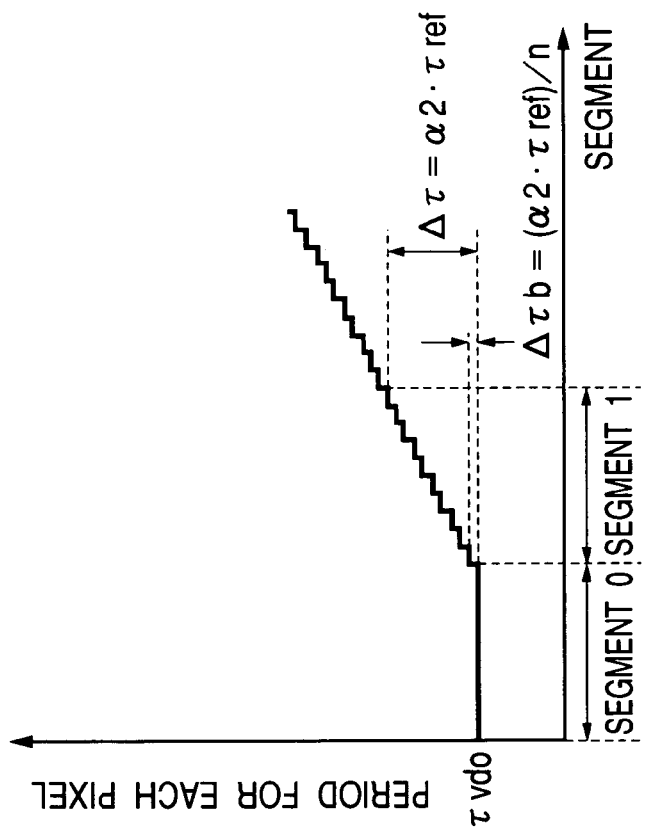
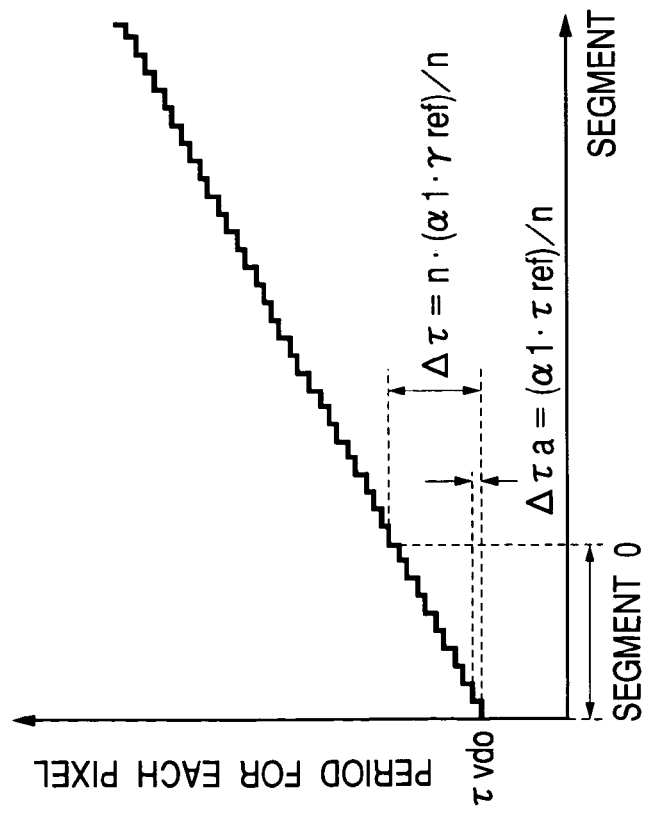

SCAN DIRECTION

WIDTH: PERIOD OF CORRECTED IMAGE CLOCK

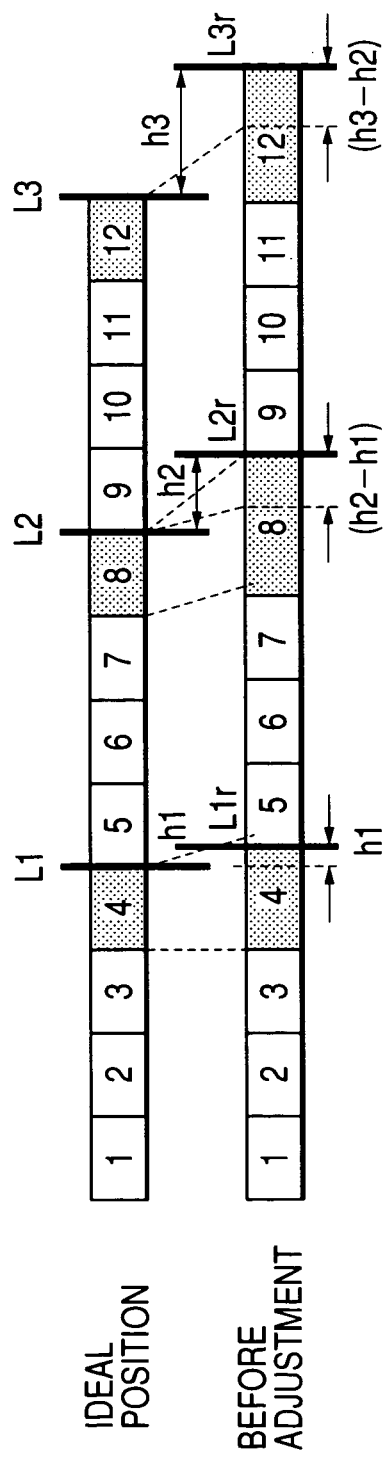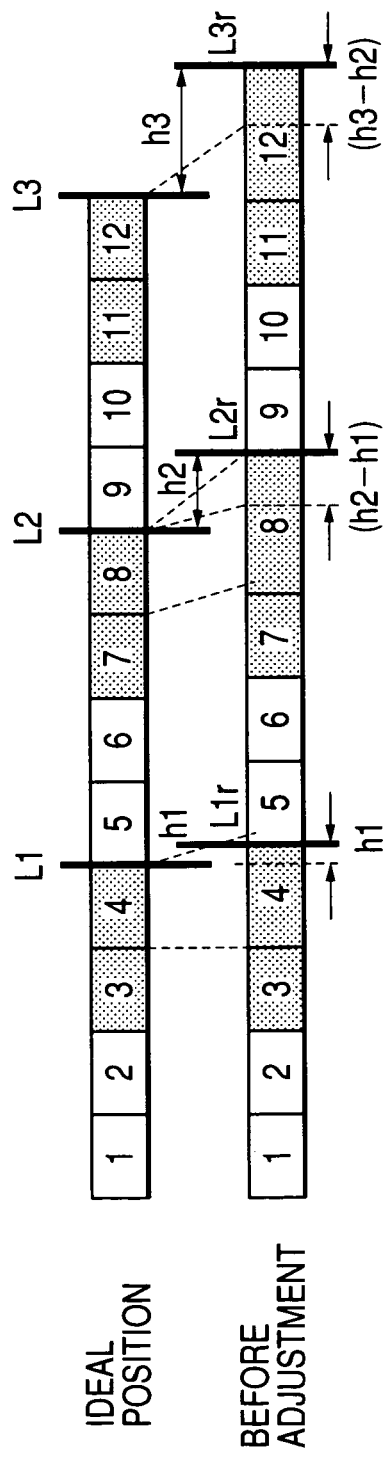

ADDITION/
SUBTRACTION

MULTIPLICATION

SHIFT OF
CORRECTION
POSITION

ADJUSTMENT OF
MAGNIFICATION
FOR CORRECTION
POSITION

FREQUENCY MODULATION APPARATUS AND FREQUENCY MODULATION METHOD

BACKGROUND OF THE INVENTION

1. Field of the Invention

The present invention relates to a frequency modulation apparatus and a frequency modulation method for generating an image clock that is used for turning on/off a laser beam that scans an image bearing member, such as a photosensitive drum.

2. Related Background Art

In an electrophotographic image forming apparatus, generally, latent image forming is performed by turning on or off a laser beam emitted by a semiconductor laser and by exposing a photosensitive drum to the laser beam using a polygon mirror, and the image forming is performed by developing the latent image to obtain a toner image and transferring the toner image to a recording medium.

For this image forming apparatus, a constant clock is always employed as an image clock that is required for a laser controller that turns on or off a laser beam in accordance with input image data, and as a reference clock that is used as a reference for the generation of the image clock. The reason for this is as follows. If a reference clock is not constant, an image clock having a correct frequency can not be generated, a fluctuation is caused at this frequency, and the ON/OFF timing for the laser beam is shifted from the proper timing. Accordingly, the dot formation location for a latent image formed on a photosensitive member is slightly changed, and as a result, image distortion, misregistration and uneven coloring occur.

Further, for the image forming apparatus, a f-θ lens 40 is located between a polygon mirror 38 and a photosensitive member 42 in FIG. 1. The f-θ lens 40 possesses such optical characteristics as a laser beam condensing function and a distortion aberration correction function for ensuring linearity is maintained for scanning along a time axis, and is provided in order to scan a photosensitive member with a laser beam at a uniform speed. Therefore, the characteristics of the f-θ lens 40 greatly affect the printing accuracy in the scan direction.

In FIG. 10, a relationship between a print position and the distortion rate of the f-θ lens 40. The f-θ lens 40 has the f-θ characteristic, which is an optical characteristic shown by a curve in FIG. 10, and generally, as it is closer to the end area, the speed of scanning the photosensitive member 42 is increased, so that scanning at a completely uniform velocity is not obtained. That is, the distortion rate is increased from the center of the f-θ lens 40 (the central print position) to the end, and this is greatly related to a shift in the print positions at both ends of an image.

A detailed explanation for this problem will be described while referring to FIG. 11. When a specific pixel at the main scan end is denoted by Ps(N–1) and the next pixel is denoted by PsN, an interval Ds between the pixels at the end areas is represented as $$Ds = PsN - Ps(N-1).$$

Similarly, when a specific pixel in the scan center area is denoted by Pc(N–1) and the next pixel is denoted by PcN, a distance Dc between these pixels is represented as $$Dc = PcN - Pc(N-1).$$

Because of the above described characteristic of the f-θ lens 40, Ds>Dc is obtained, i.e., the pixel interval differs depending on the scanning position. As a result, an image is printed while the magnification rate differs, depending on the portions of the image, and an accurate image reproduction is not possible.

In order to minimize the print position shift that occurs due to the characteristic of the f-θ lens, conventionally, a frequency modulation technique is employed to modulate the frequency of an image write clock, and the shift in the print position is corrected electrically. There are, for example, a method for uniquely changing a frequency for one scan interval and a method for dividing one scan interval, and for modulating a frequency in an analog manner (e.g., Japanese Patent Application Laid-Open No. H2-282763).

However, as is apparent from FIGS. 10 and 11, the characteristic of the f-θ lens is complicated, and the distortion rate is increased, depending on the lens material. Therefore, according to the method used for uniquely changing the frequency for one scan interval, and the method for dividing one scan interval and modulating the frequency in an analog manner, accuracy can not be expected for the correction of the print position shift that occurs due to the characteristic of the f-θ lens. As a result, the printing quality is deteriorated.

For a color image forming apparatus, the above described f-θ lens 40 is provided for each of the colors Y, M, C and K. Because of the variations in the characteristics of the individual colors, the locations at which the photosensitive drum 42 is irradiated is shifted, even for pixels at the same position. As a result, misregistration in image forming occurs, and the image quality is remarkably deteriorated.

To resolve this problem, a well known apparatus is provided in Japanese Patent Application Laid-Open No. H9-218370 (Fuji Film). This apparatus partially modulates the frequency of an image clock along one line and ensures that scanning is performed at a uniform speed, so that any scan speed fluctuation produced by the f-θ characteristic is canceled.

However, as is shown in FIG. 15, even for the same lens, the f-θ characteristic differs for each apparatus due to errors in the size and attachment of the lens, and irradiation location shifts can not be avoided. Expensive lenses are required to reduce the variations in manufacturing lenses, and complicated operations are required to accurately position and attach the lenses.

A method for correcting variations in individual apparatuses is disclosed in Japanese Patent Application Laid-Open No. H11-198435 (Fuji Xerox). According to this method, instead of identical frequencies being modulated for a plurality of apparatuses, in each apparatus a registration mark is detected at multiple predetermined locations in the main scan direction, and frequency modulation, based on the detection of the distance shifted, is performed to correct for the shifting. According to this method, corrections in consonance with the characteristics of the individual apparatuses are enabled and performed.

However, as is shown in FIG. 12, since the absolute scan position for a specific pixel N is the cumulative accumulation from the scan start position, the positions of pixels 0 to (N–1) must be established, i.e., the pixel clock frequencies up to fn–1 must be determined. Therefore, all the frequency setup values must be used to perform calculations for the individual apparatuses for which readjustments are required. And since for these calculations, complicated algorithms and procedures are required, and since all the setup values must be stored in FIG. 13, an increased memory (RAM) capacity is required.

Further, as is shown in FIG. 25, the frequency modulation configuration of an image forming apparatus constituted by multi-beam laser comprises: a plurality of setting registers 72, 74 and 76 and a plurality of frequency modulating devices 71, 73 and 75 for generating image signal clocks 77, 78 and 79 for a plurality of laser beams. The setting registers 72, 74 and 76 hold setup values (variable-magnification coefficients) for one line in the main scan direction of a laser beam, or for the number of segments constituting the line. The frequency modulating devices 71, 73 and 75 generate the image signal clocks 77, 78 and 79 based on a reference clock signal Refclk, which is generated by a reference clock generating unit 70, and the setup values that are received from the corresponding setting registers 72, 74 and 76.

An image forming apparatus constituted by multi-beam lasers requires setting registers, i.e., correction tables, equivalent in number to the number of laser beams in order to perform corrections consonant with the characteristics of the f-θ lens. That is, a plurality of correction tables must be prepared in accordance with the locations passed by the laser beams and the characteristics of the f-θ lens. Therefore, for a plurality of laser beams, it takes time to perform corrections such as the preparation of correction tables, and the operation is very demanding.

SUMMARY OF THE INVENTION

It is one object of the present invention to provide a frequency modulation apparatus that can correct, with high accuracy, a printing ratio and that can obtain a superior printing quality.

To achieve this object, according to one aspect of the present invention, a frequency modulation apparatus comprises:

a segmentalizing device for dividing, into a plurality of segments in units of pixel, a main scan line on an image bearing member scanned by a laser beam;

an auxiliary clock calculation device for employing a reference clock period, and variable-magnification coefficients corresponding to the respective segments, to calculate auxiliary clock periods for the respective segments;

an image clock generating device for generating image clocks for the respective segments based on an initial predesignated period value and the auxiliary clock periods for the respective segments;

a reference value storing device for storing a reference value;

a detecting device for detecting a difference between the reference value and an actual laser irradiation location; and a correcting device for correcting a shift in the laser irradiation location in accordance with the detection results obtained by the detecting device.

With this configuration, a superior printing quality can be obtained that is not affected by the characteristics of an f-θ lens.

The above and other objects, features and advantages of the invention will become more apparent from the following detailed description taken in conjunction with the accompanying drawings.

BRIEF DESCRIPTION OF THE DRAWINGS

FIGS. 5A and 5B are graphs in each of which is shown a relationship when the period for the image clock in the segment is varied at multiple steps;

FIG. 16 is a diagram for explaining a second embodiment of the present invention (one adjusted segment/block);

FIG. 17 is a diagram for explaining a third embodiment of the present invention (multiple adjusted segments/block);

DETAILED DESCRIPTION OF THE PREFERRED EMBODIMENTS

Figure 1:
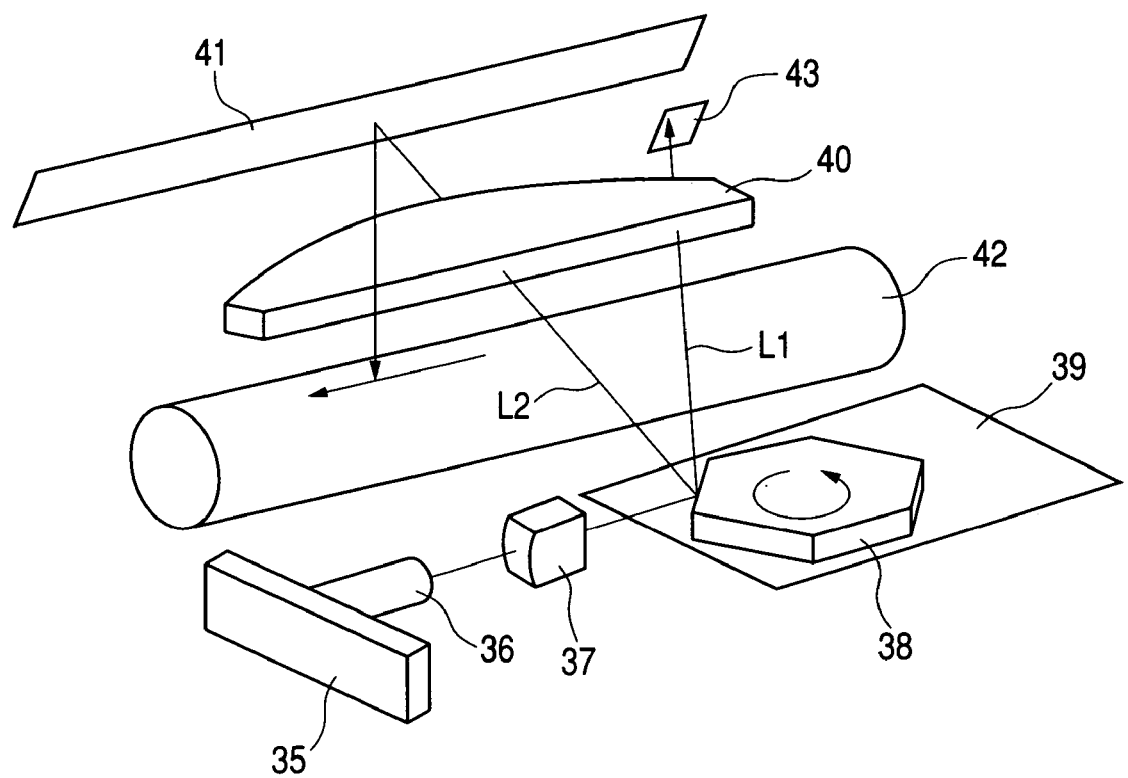
FIG. 1 a specific diagram showing the arrangement of the optical scanning unit of an image forming apparatus according to a first embodiment of the present invention.

The present invention will now be described below in detail while referring to the accompanying drawings showing preferred embodiments therefor. In the drawings, elements and parts which are identical throughout the views are designated by identical reference numerals, and a duplicate descriptions therefor are omitted.

FIG. 1 is a specific diagram showing the configuration of the optical scanning unit of an image forming apparatus according to a first embodiment of the present invention.

As is shown in FIG. 1, the optical scanning unit comprises: a laser unit 36 constituted by a semiconductor laser and a collimator lens (not shown), and a laser driving circuit 35 for driving the laser unit 36. As control signals for turning on or off a laser beam, a printing pattern signal and an image clock, which will be described later, are transmitted by a main scan magnification correcting circuit to the laser driving circuit 35.

In a non-image area, a laser beam L1 emitted by the laser unit 36 is passed through a cylindrical lens 37 and reaches a polygon mirror 38 that is rotated at a uniform angular velocity by a scanner motor unit 39. The laser beam L1 that has reached the polygon mirror 38 is deflected by the polygon mirror 38, and the deflected beam then enters an f-θ lens 40. Because of the condensing function and the distortion aberration correction function of the f-θ lens 40, the laser beam is converted into a laser beam that scans at a uniform speed in a direction perpendicular to the rotation direction of a photosensitive drum 42. The obtained laser beam is received by a beam detecting sensor 43.

In an image area, in the same way as the laser beam L1, a laser beam L2 passes through the cylindrical lens 37, the polygon mirror 38 and the f-θ lens 40, and is converted into a laser beam that scans at a uniform speed in the direction perpendicular to the rotation direction of the photosensitive drum 42. The obtained laser beam passes through the f-θ lens 40, and is reflected by a reflection mirror 41, and the reflected beam is projected onto the photosensitive drum 42. Through this beam irradiation, a latent image is formed on the photosensitive drum 42, and by using toner, is visualized as a toner image. The toner image is then transferred and fixed to a recording medium. As a result, an image is formed on the recording medium.

Figure 2:
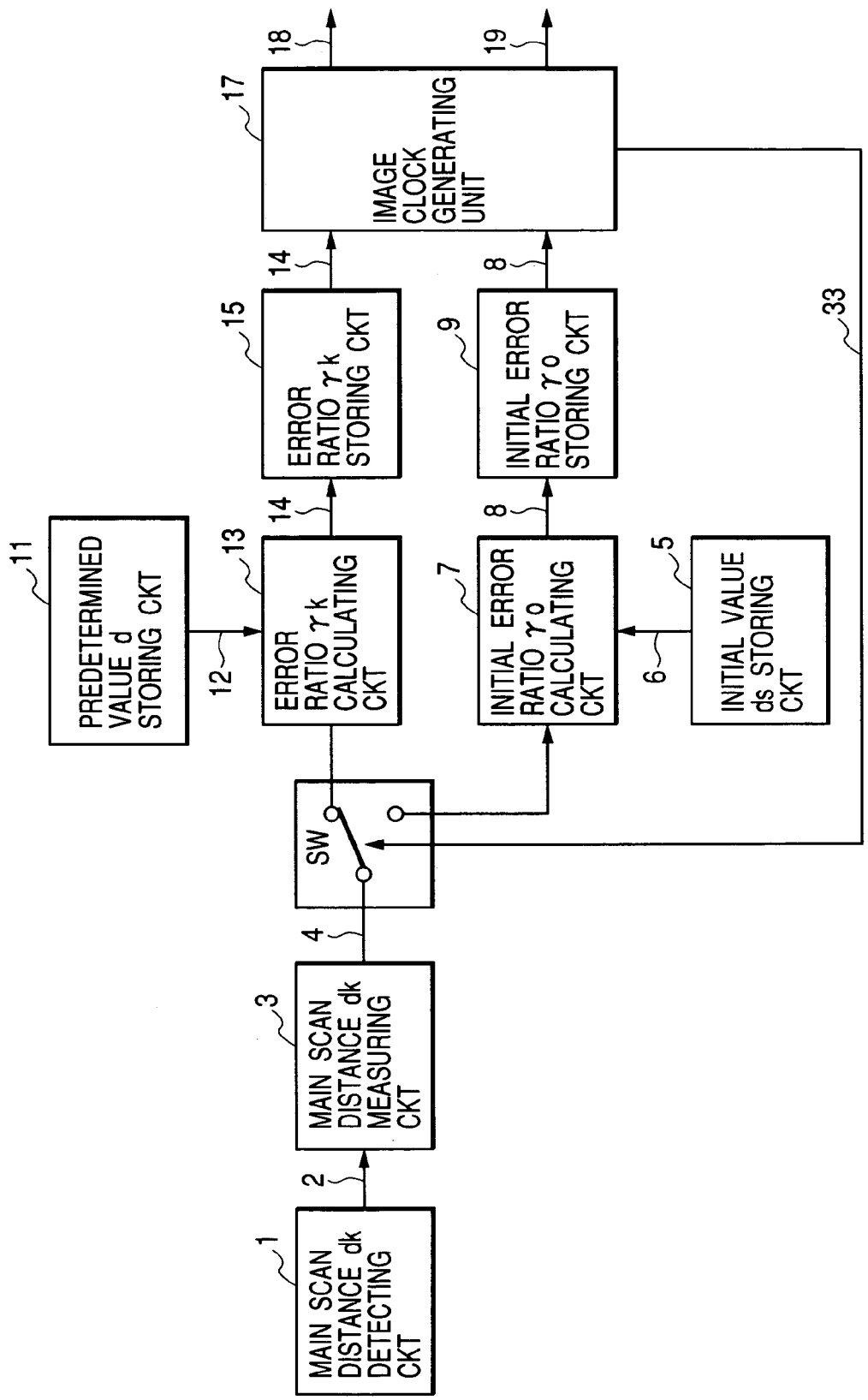
FIG. 2 is a block diagram showing the arrangement of a main scan magnification correcting circuit according to the first embodiment of the invention.

The main scan magnification correcting circuit will now be described while referring to FIG. 2. FIG. 2 is a block diagram showing the arrangement of the main scan magnification correcting circuit according to the first embodiment of this invention.

The main scan magnification correcting circuit is a circuit that modulates an image clock to correct a printing ratio (a shift in the print positions) of the main scan line. As is shown in FIG. 2, the main scan magnification correcting circuit includes a main scan distance dk detecting circuit 1. The main scan distance dk detecting circuit 1 detects, as a main scan distance, a distance between target pixels in a reference image that is read by an image reading unit that will be described later, and outputs a main scan distance signal 2 that represents the value of the detected distance. The main scan distance signal 2 is transmitted to a main scan distance dk measuring circuit 3, which then converts this signal 2 into a main scan distance measurement signal 4 that is time data. The main scan distance dk detecting circuit 1 and the main scan distance dk measuring circuit 3 will be described later in detail.

The main scan distance measurement signal 4 is transmitted to a switch SW. And the changing of the switch SW is controlled in accordance with a modulated clock control signal 33 output by an image clock generating unit 17, and in accordance with the state of the switch SW, the main scan distance measurement signal 4 is transmitted to either an initial error ratio γ0 calculating circuit 7 or an error ratio γk calculating circuit 13.

The initial error ratio γ0 calculating circuit 7 calculates a ratio of a value indicated by the main scan distance measurement signal 4 to an initial value 6 that is predesignated for an initial value ds storing circuit 5, and outputs the obtained ratio as an initial error ratio signal 8. The initial error ratio signal 8 is stored in an initial error ratio γ0 storing circuit 9.

The error ratio γk calculating circuit 13 calculates a ratio of a value indicated by the main scan distance measurement signal 4 to a predetermined value 12 that is predesignated for a predetermined value d storing circuit 11, and outputs the obtained ratio as an error ratio signal 14. The error ratio signal 14 is stored in an error ratio γk storing circuit 15.

The initial error ratio signal 8, which is stored in the initial error ratio γ0 storing circuit 9, and the error ratio signal 14, which is stored in the error ratio γk storing circuit 15, are transmitted to the image clock generating unit 17. Based on the value indicated by the initial error ratio signal 8 or the value indicated by the error ratio signal 14, the image clock generating unit 17 performs frequency modulation for a predesignated image clock, and outputs the obtained clock as an image clock 18. Further, the image clock generating unit 17 also outputs a printing pattern control signal 19 indicating an image that has been read by the image reading unit.

(Image Clock Generating Unit)

Figure 3:
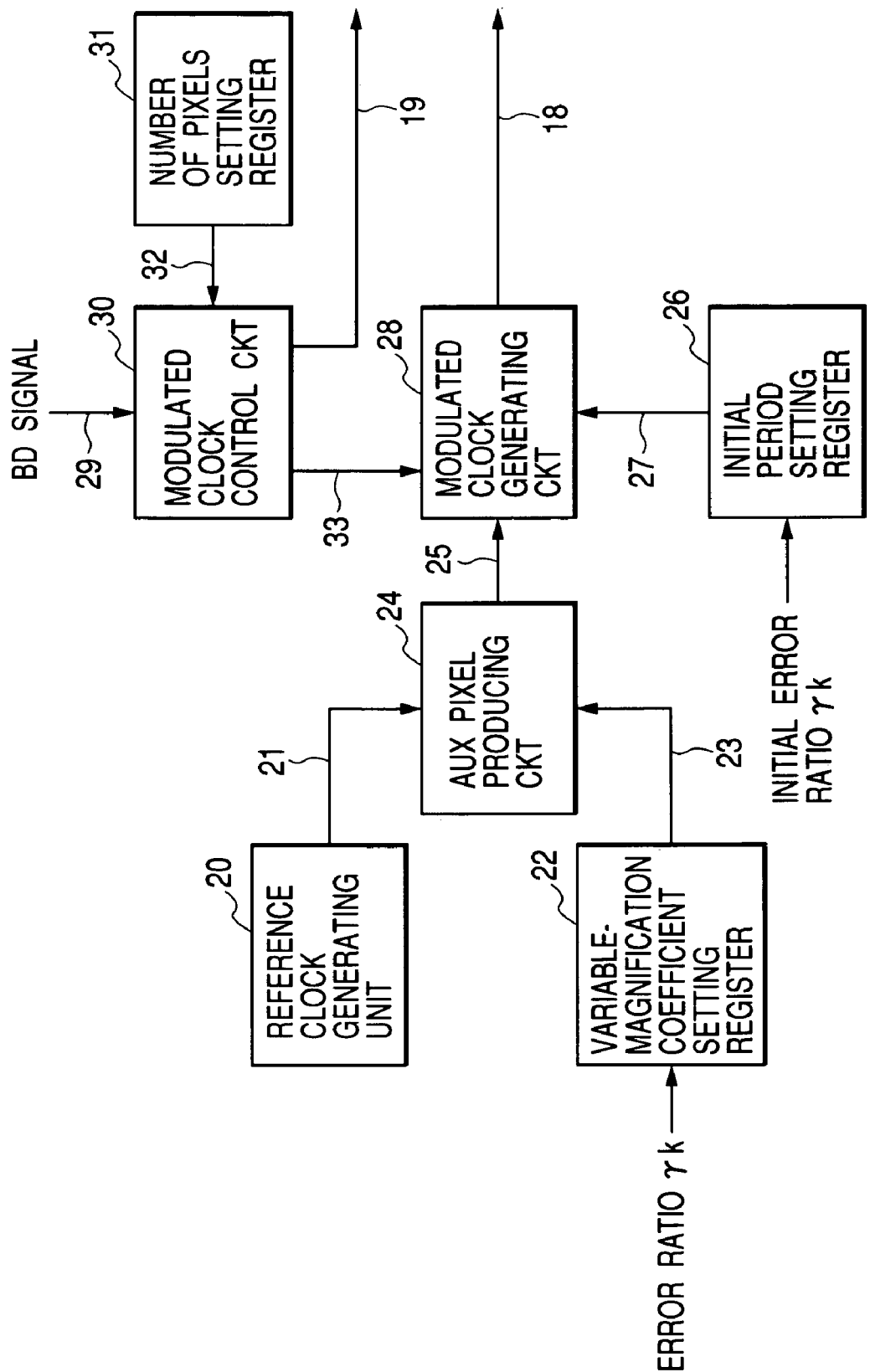
FIG. 3 is a block diagram showing the arrangement of an image clock generating unit 17 in FIG. 2.
Figure 4:
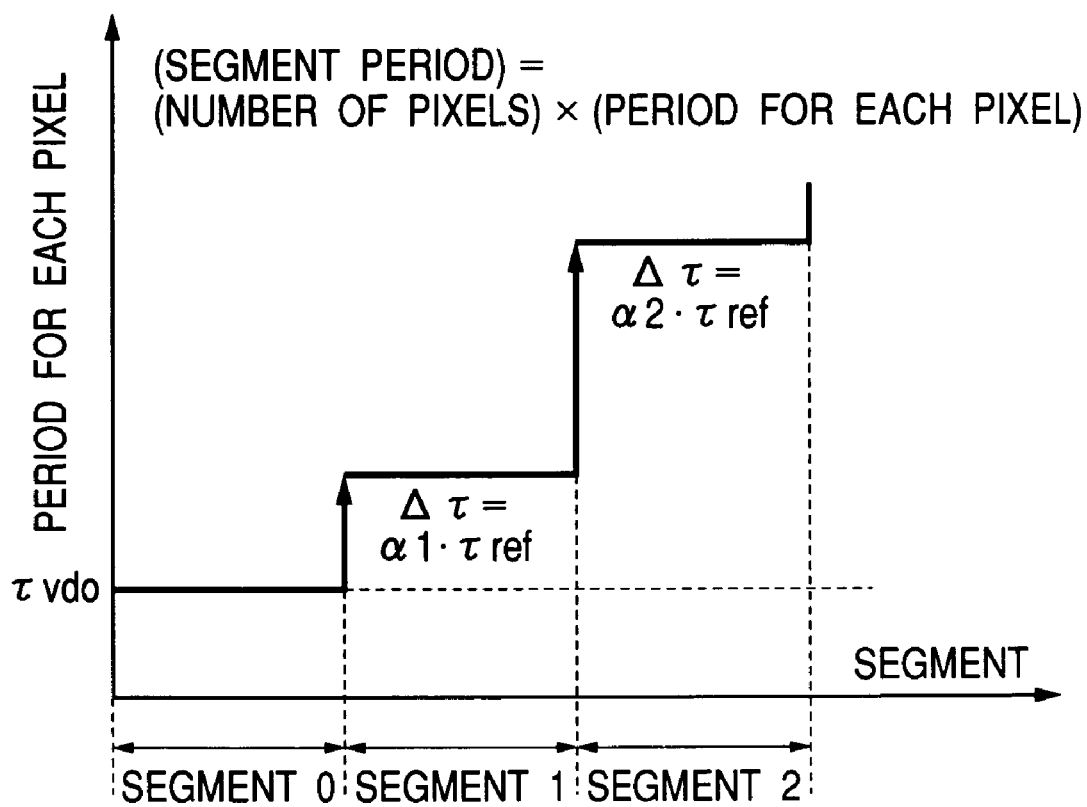
FIG. 4 is a graph showing the relationship between segments and the image clock periods in these segments.

The arrangement of the image clock generating unit 17 will now be described while referring to FIGS. 3 and 4. FIG. 3 is a block diagram showing the arrangement of the image clock generating unit 17 in FIG. 2, and FIG. 4 is a graph showing a relationship between a segment and the period of the image clock 18 in the segment.

As is shown in FIG. 3, the image clock generating unit 17 includes a reference clock generating unit 20, a variable-magnification coefficient setting register 22, an auxiliary pixel producing circuit 24, an initial period setting register 26, a modulated clock control circuit 30, a number of pixels setting register 31 and a modulated clock generating circuit 28.

The reference clock generating unit 20 generates a reference clock signal 21 having an arbitrary frequency. In accordance with an error ratio γk, a variable-magnification coefficient 23 is designated to vary the period ratio of the reference clock signal 21, and is held in the variable-magnification coefficient setting register 22.

The auxiliary pixel producing circuit 24 produces an auxiliary pixel period 25 based on the reference clock signal 21 and the variable-magnification coefficient 23. When the period of the reference clock signal 21 is, for example, τref, the variable-magnification coefficient 23 is αk and the auxiliary pixel period 25 is Δτ. Δτ is represented by the following equation (1).

$$\Delta\tau = \alpha k \cdot \tau\text{ref} \qquad (1)$$

wherein the variable-magnification coefficient 23 (αk) is set to such a value that the auxiliary pixel period 25 (Δτ) is sufficiently shorter than the period of the image clock 18.

In accordance with an initial error ratio γ0, an initial value 27 (τvdo) is set for the period of the image clock 18 output by the image clock generating unit 17, and is held in the initial period setting register 26.

The modulated clock control circuit 30 divides one line in the main scan direction into a plurality of segments, each of which is constituted by an arbitrary number of pixels. The modulated clock control circuit 30 controls the image clock period between the segments, or within each segment. The number of pixels in a segment is designated a pixel count setup value 32 stored in the number of pixels setting register 31. Either a different number of pixels or the same number of pixels may be employed for the individual segments.

The detailed operation of the modulated clock control circuit 30 will now be described. When the modulated clock control circuit 30 receives, from the beam detecting sensor 43, a beam detection signal (BD signal) 29 indicating a printing reference position, the modulated clock control circuit 30 generates the modulated clock control signal 33 for the first segment (segment 0), and outputs this signal 33 to the modulated clock generating circuit 28. Upon receiving the modulated clock control signal 33, the modulated clock generating circuit 28 outputs the image clock 18 having the initial period 27 ($\tau$vdo) that is stored in the initial period setting register 26.

The modulated clock control circuit 30 then generates the modulated clock control signal 33 for the next segment (segment 1), and outputs this signal 33 to the modulated clock generating circuit 28. Upon receiving the modulated clock control signal 33, the modulated clock generating circuit 28 employs the auxiliary pixel period 25 ($\Delta\tau$) and the initial period 27 ($\tau$vdo) to generate, as the image clock 18, a modulated clock signal $\Delta$T1 that has a period represented by the following equation (2).

$$\Delta T1 = \tau vdo + \alpha 1 \cdot \tau ref \qquad (2)$$

wherein $\alpha$1 denotes a variable-magnification coefficient for the segment 1.

Further, the modulated clock control circuit 33 generates the modulated clock control signal 33 for the next segment (segment 2), and outputs this signal 33 to the modulated clock generating circuit 28. Upon receiving the modulated clock control signal 33, the modulated clock generating circuit 28 employs the auxiliary pixel period 25 and the initial period 27 to generate, as the image clock 18, a modulated clock signal $\Delta$T2 that has a period represented by the following equation (3).

$$\Delta T2 = \tau vdo + \alpha 1 \cdot \tau ref + \alpha 2 \cdot \tau ref \qquad (3)$$

wherein $\alpha$2 denotes a variable-magnification coefficient for the segment 2.

In the same manner, modulated clock control signal 33 is generated for segments following the segment 2 and is output as the image clock 18.

As is described above, under the control of the modulated clock control circuit 30, the image clock 18 having a plurality of periods in one scan line is output from the modulated clock generating circuit 28.

Furthermore, at least one of the points whereat the segments are changed, the modulated clock control circuit 30 selects the last pixel in the preceding segment, or an arbitrary number of pixels proceeding from the last pixel, and generates the printing pattern control signal 19 that includes the selected pixels. It should be noted, however, that the location whereat the segment switching pattern is output is identical for each line.

According to the above described control method, one scan line is divided into a plurality of segments, and the constant image clock 18 is generated for each segment. However, frequency modulation of the image clock may be performed for each segment.

While referring to FIGS. 5A and 5B, an explanation will now be given for a segment period control method employed when the frequency modulation for the image clock is performed in the segment. FIGS. 5A and 5B are graphs in each of which is shown a relationship when the period for the image clock 18 in the segment is varied at multiple steps.

(1) Case wherein the initial segment (segment 0) is varied

When the frequency of the image clock 18 is varied beginning at the initial segment (segment 0), and when, as is shown in FIG. 5A, the initial period is $\tau$vdo, the number of pixels for one segment is n, the variable-magnification coefficient (segment 0) is $\alpha$1 and the reference clock period is $\tau$ref. A period $\Delta\tau$a for one pixel in the segment 0 and the total period $\Delta$T0 for the segment 0 are represented by the following equations (4) and (5).

$$\Delta \tau a = (\alpha 1 \cdot \tau ref)/n \qquad (4)$$

$$\Delta T0 = \tau vdo + \{n \cdot (n+1)/2\} \cdot \{(\alpha 1 \cdot \tau ref)/n\} \qquad (5)$$
$$= \tau vdo + \{(n+1)/2 \cdot (\alpha 1 \cdot \tau ref)\}$$

(2) Case wherein the initial segment (segment 0) is fixed

When the frequency of the image clock 18 for the initial segment (segment 0) is fixed and the frequencies of the image clocks 18 for the succeeding segments are varied, the total period for the segment 0, $\Delta$T0, shown in FIG. 5B, is represented by the following equation (6).

$$\Delta T0 = n \cdot \tau vdo \qquad (6)$$

Whereas, for the next segment of the initial segment, i.e., the segment 1, when the variable-magnification coefficient (segment 1) is $\alpha$2 and the reference clock period is $\tau$ref, a period $\Delta\tau$b for one pixel in the segment 1 and the total period $\Delta$T1 for the segment 1 are represented by the following equations (7) and (8).

$$\Delta \tau b = (\alpha 2 \cdot \tau ref)/n \qquad (7)$$

$$\Delta T1 = \tau vdo + \{n \cdot (n+1)/2\} \cdot \{(\alpha 2 \cdot \tau ref)/n\} \qquad (8)$$
$$= \tau vdo + \{(n+1)/2\} \cdot (\alpha 2 \cdot \tau ref)$$

For the following segments, a period $\Delta\tau$b for one pixel and the total period $\Delta$Tn (n≧2) can be represented using the same equations.

As is apparent from FIGS. 5A and 5B, either when the frequency of the image clock 18 is varied beginning at the initial segment (segment 0), or when the frequency of the image clock 18 for the initial segment (segment 0) and the frequencies of the image clocks 18 for the succeeding segments are changed, continuity at the segment switching positions can be maintained.

Figure 6:
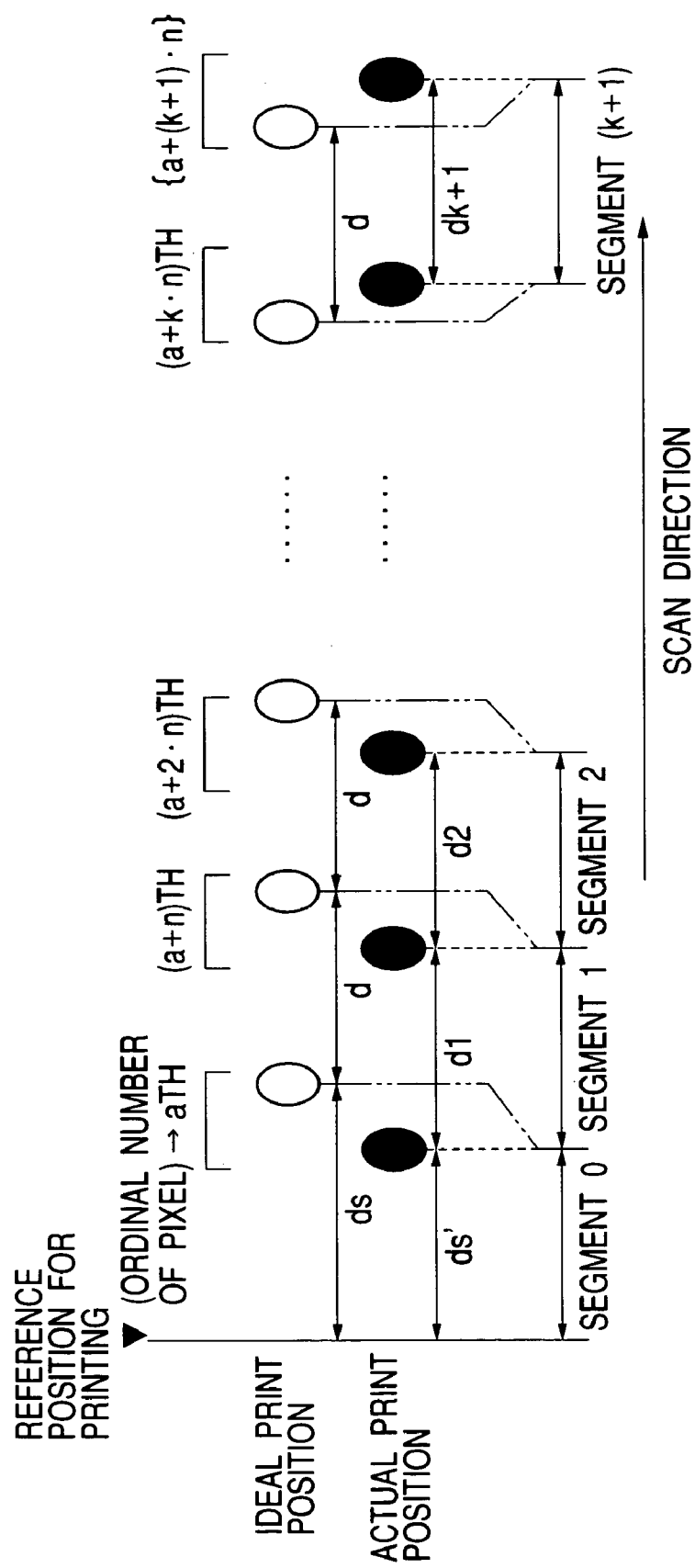
FIG. 6 is a diagram for explaining a control method used by the main scan magnification correcting circuit in FIG. 2.

While referring to FIG. 6, an explanation will now be given for a method for calculating the initial error ratio $\gamma$0 and the error ratio $\gamma$k, and a method for correcting the initial period 27 and the variable-magnification coefficient 23 in accordance with these ratios. FIG. 6 is a diagram for explaining a control method employed by the main scan magnification correcting circuit in FIG. 2.

A value corresponding to the initial error ratio $\gamma$0 and a value corresponding to the error ratio $\gamma$k are respectively stored in the initial period setting register 26 and the variable-magnification coefficient setting register 22, and based on these values, the image clock 18 is generated. The initial error ratio $\gamma$0 is a ratio of a distance (the length of the segment 0) from the printing reference position, which is determined based on the BD signal 29, to the actual print position of the first pixel, to a distance (the length of the segment 0) from the printing reference position to the ideal print position of the first pixel. The error ratio γk is a ratio of a distance (the length of the segment 1, . . . ) from the actual print position of a specific pixel to the actual print position of the next pixel, to a distance (the length of the segment 1, . . . ) from the ideal print position of the specific pixel to the ideal print position for the next pixel.

The actual print position is the print position of a pixel when, based on a predetermined image clock 18, a printing pattern is printed in accordance with the printing pattern control signal 19 setting the printing of one pixel for each segment. This print position is obtained by reading the printing pattern. The processing performed to detect the actual print position will be described later.

The printing pattern is formed of one dot or a plurality of dots located at a position preceding or following the switching of the segments. For example, the segment 0 of the printing pattern is formed of the last one dot or last multiple dots in the interval for the segment 0. The segment 1 of the printing pattern is formed of the first dot or first multiple dots in the interval for the segment 1, or may be formed of multiple dots that extend from the last portion of the segment 0 interval to the first portion of the segment 1 interval. When the number of segments is m and the number of patterns to be printed is k, 2≧k≧m≧256 relationship is established, and printing may not necessarily be performed where the segments are switched. Further, the image clock for printing in the segment 0 interval is T0=τvdo and the image clock for printing in the segment 1 interval is T1=α1·τref.

On the other hand, the ideal print position is a pixel position for the printing pattern that is theoretically obtained in advance while taking into account the expected optical characteristic of the f-θ lens and the image clock period. A distance (theoretical value) ds from the printing reference position to the ideal print position for the first pixel is stored as the initial value 6 in the initial value ds storing circuit 5. A distance (theoretical value) d from the ideal print position for a specific pixel to the ideal print position for the next pixel is stored as the initial value 12 in the predetermined value d storing circuit 11.

When S denotes the initial period for the initial segment and S' denotes a corrected initial period, and when ds' denotes a distance from the printing reference position to the actual print position of the first pixel, the initial error ratio γ0 is represented as ds'/ds, and the following equation (9) is established.

$$S' = S \cdot (ds'/ds) \quad (9)$$
$$= \gamma 0 \cdot S$$

Therefore, in accordance with equation (9), the initial period (theoretical value) stored in advance in the initial period setting register 26 is corrected to the period S' consonant with the initial error ratio γ0.

For the ideal print position, when n denotes the number of pixels constituting each segment (each segment following the segment 1), t denotes a period for each segment and Ddpi denotes a resolution (print width), equation (10) is established.

$$t = n \cdot \tau vdo$$
$$d = n/Ddpi \quad (10)$$

wherein τvdo is an image clock period.

Similarly, for the actual print position, when τseg1 denotes an image clock period for the segment 1 and Ddpi1' denotes the actual resolution, equation (11) is established.

$$t = n \cdot \tau seg1$$
$$d1 = n/Ddpi1' \quad (11)$$

Because of the relationship between the ideal print position d, which is stored for the segment 1 in the predetermined value d storing circuit 11, and the actual print position d1 (the main scan distance measurement signal 4), which is obtained by the main scan distance dk measuring circuit 3, the error ratio γ1 is represented as d1/d, and equation (12) is obtained.

$$d:d1 = n/Ddpi:n/Ddpi1' = n \cdot \tau vdo:n \cdot \tau seg1$$
$$\tau seg1 = \tau vdo \cdot (d1/d)$$
$$\tau seg1 = \gamma 1 \cdot \tau vdo \quad (12)$$

The auxiliary pixel period T1 constituting the segment 1 is T1=τref·α1, based on the reference clock period τref and the variable-magnification coefficient α, and a corrected variable-magnification coefficient α1' is acquired by equation (13).

$$\tau seg1 = \tau ref \cdot \alpha 1' = \gamma 1 \tau vdo$$
$$\alpha 1' = \gamma 1 \cdot (\tau vdo/\tau ref) \quad (13)$$

Similarly, when the error ratio γ2 is represented as d2/d based on the relationship between the ideal print position d and the actual print position d2 for the segment 2, the auxiliary pixel period T2 constituting the segment 2 is T2=τref·α2, wherein the variable-magnification coefficient is α2. A corrected variable-magnification coefficient α2' is acquired by equation (14).

$$\tau seg2 = \tau ref \cdot \alpha 2' = \tau 2 \cdot \tau vdo$$
$$\alpha 2' = \gamma 2 \cdot (\tau vdo/\tau ref) \quad (14)$$

In this manner, in accordance with equations (13) and (14), the variable-magnification coefficients (theoretical values: α1 and α2) stored in advance in the variable-magnification setting register 22 are corrected to obtain variable-magnification coefficients (α1' and α2') consonant with the error ratios γk (γ1 and γ2).

Figure 7:
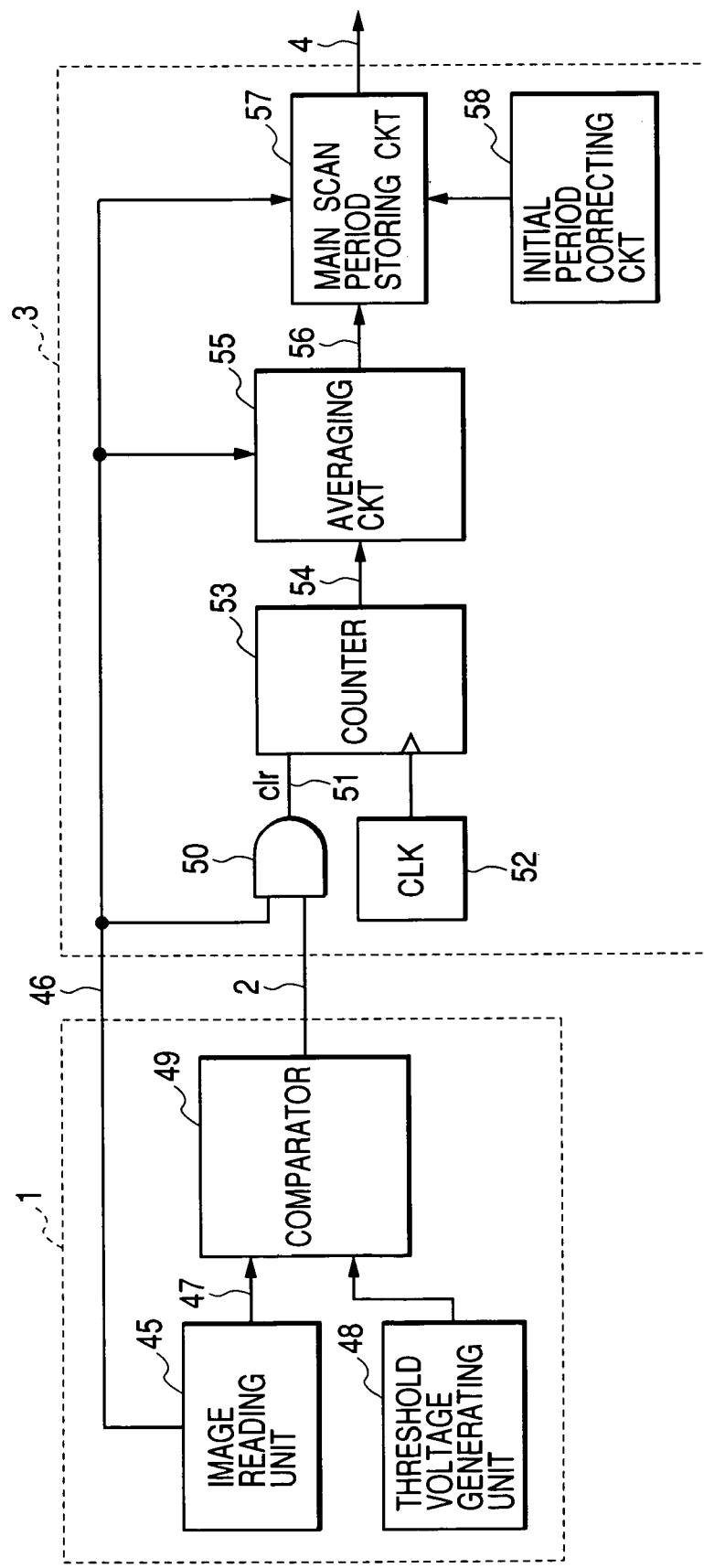
FIG. 7 is a block diagram showing the internal structure of a main scan distance dk detecting circuit and a main scan distance dk measuring circuit in FIG. 2.
Figure 8:
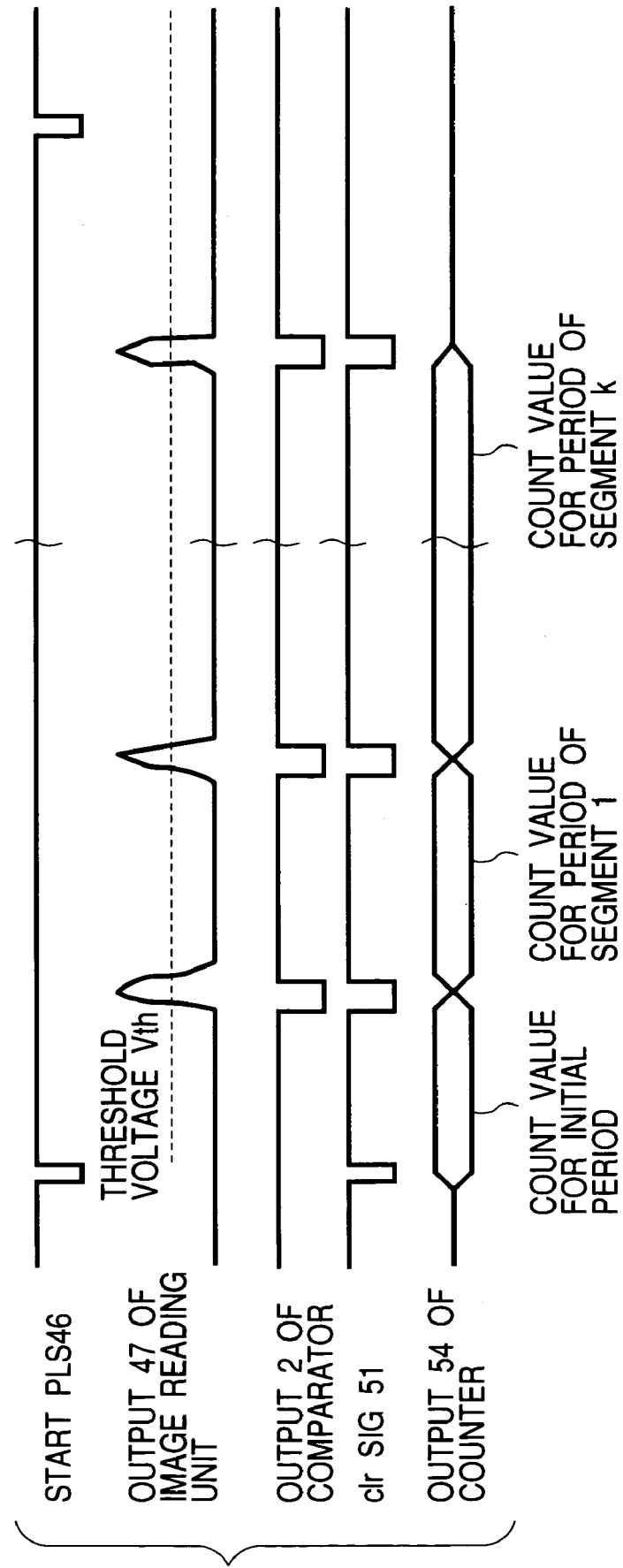
FIG. 8 is a timing chart for the essential block in FIG. 7.

The processing for detecting the actual print position will now be described while referring to FIGS. 7 to 9. FIG. 7 is a block diagram showing the internal structure for the main scan distance dk detecting circuit 1 and the main scan distance dk measuring circuit 3 in FIG. 2. FIG. 8 is a timing chart for the essential block in FIG. 7, and FIG. 9 is a diagram showing an example print pattern.

As is shown in FIG. 7, the main scan distance dk detecting circuit 1 includes an image reading unit 45, which is a reader scanner, and a comparator 49 and a threshold voltage Vth generating unit 48.

The main scan distance dk measuring circuit 3 includes an AND circuit 50, a counter clock generator CLK 52, a counter 53, an averaging circuit 55, a main scan period storing circuit 57 and an initial period correcting circuit 58.

Figure 9:
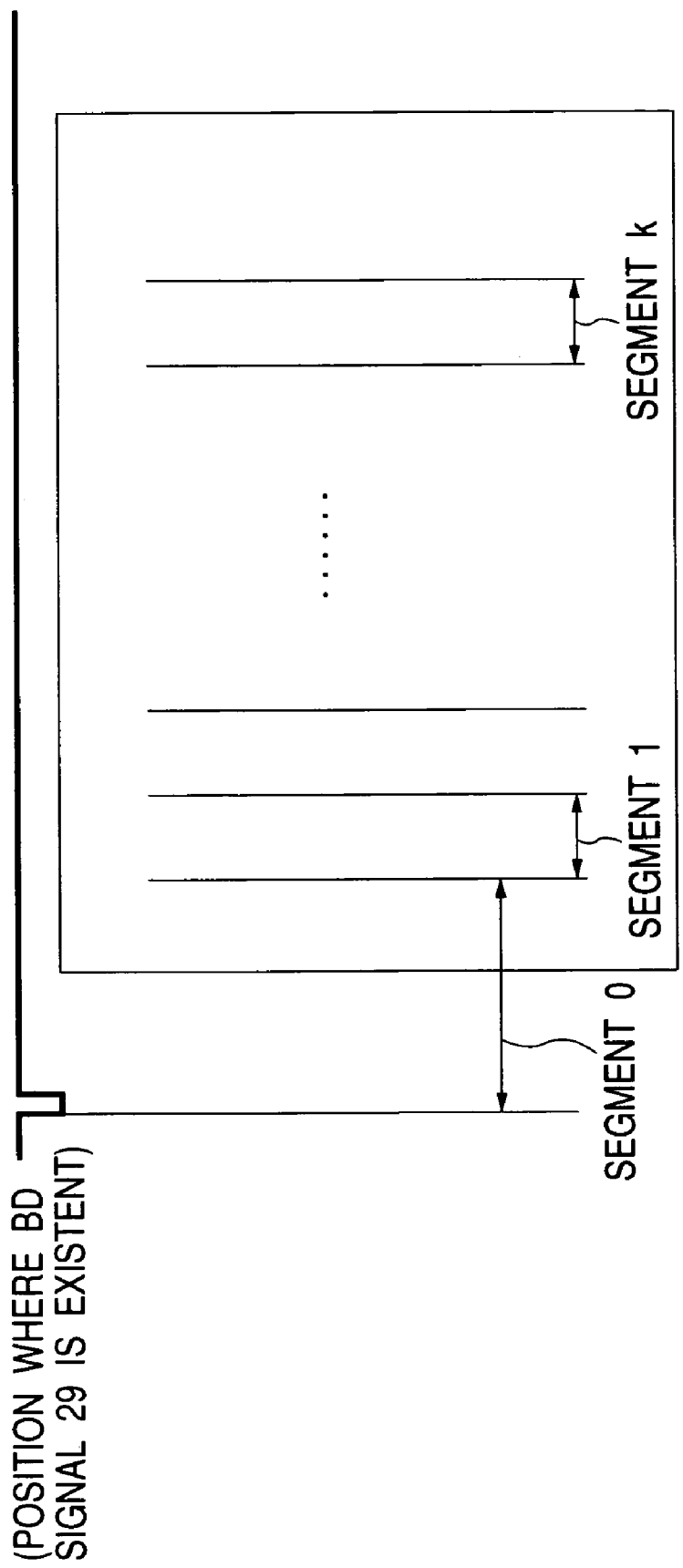
FIG. 9 is a diagram showing an example printing pattern.
Figure 10:
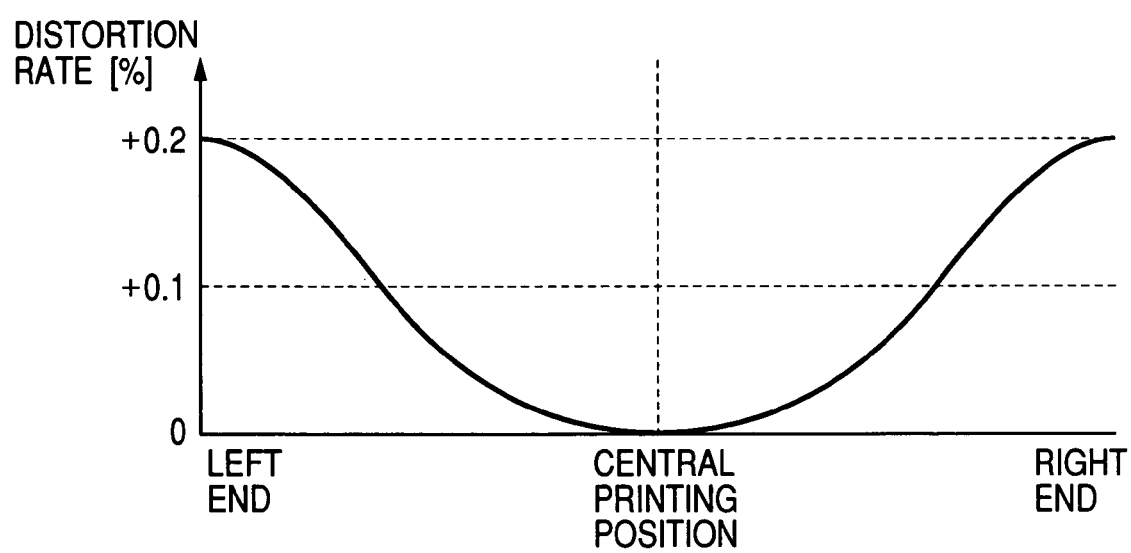
FIG. 10 is a graph showing an example relationship between print positions and the distortion rate of an f-θ lens.
Figure 11:
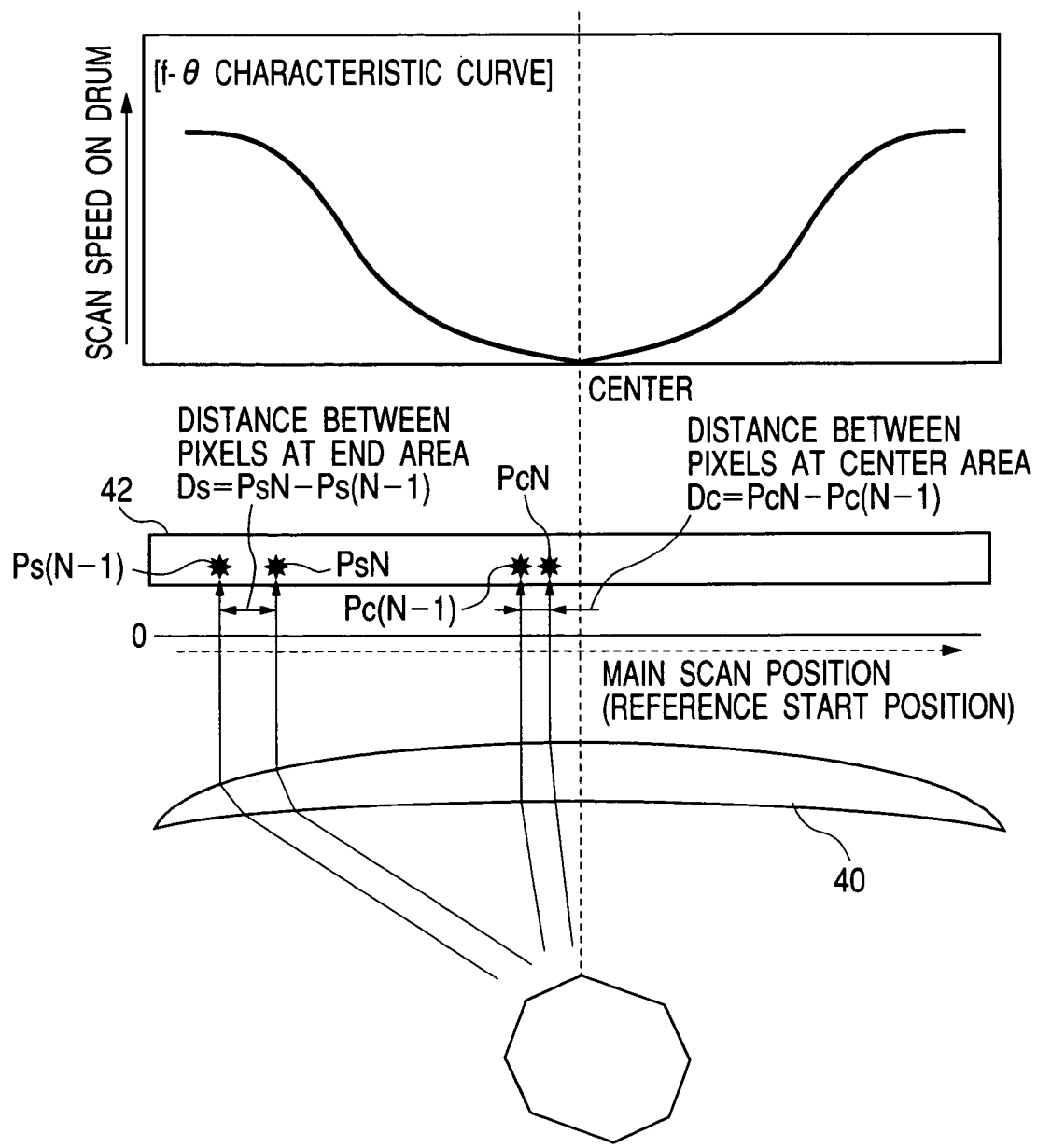
FIG. 11 is a diagram for explaining an f-θ characteristic curve and print locations on a photosensitive drum.
Figure 12:
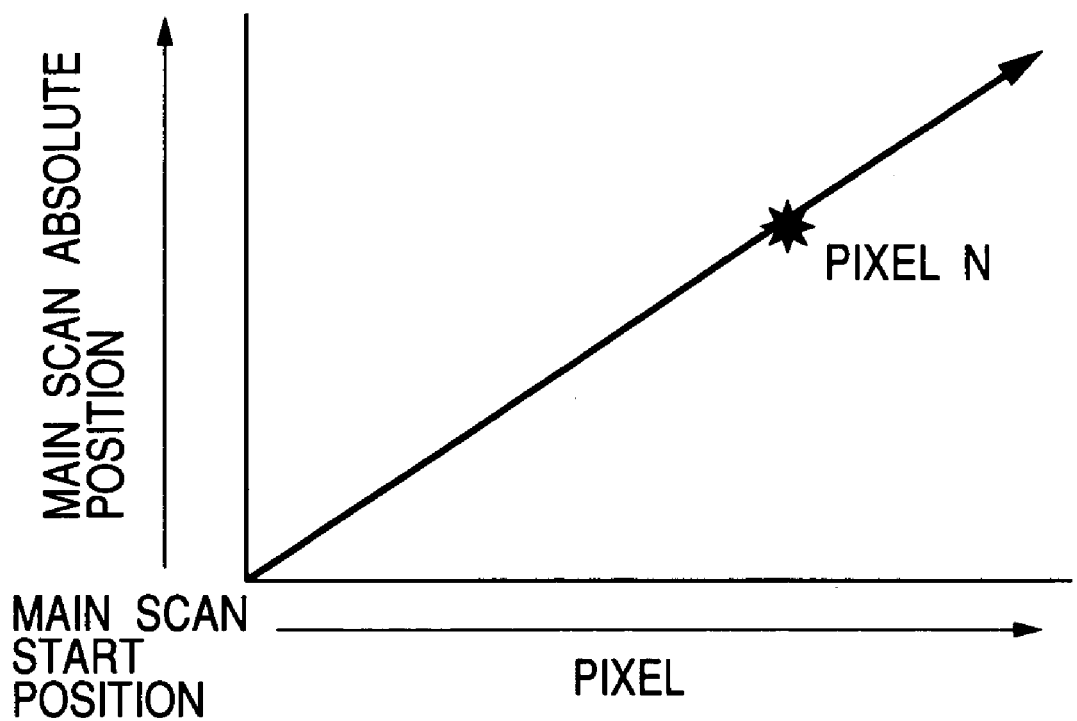
FIG. 12 is a diagram for explaining the absolute scan position for a pixel N.
Figure 13:
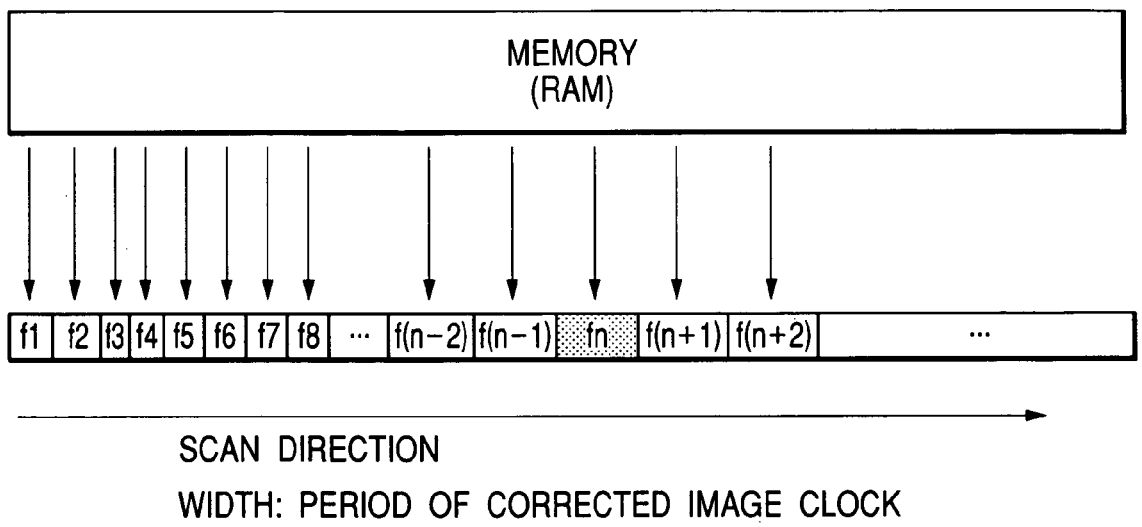
FIG. 13 a diagram showing a conventional example of the storing a setup value for performing readjustment.

When the main scan distance dk detecting circuit 1 reads, for example, a print pattern in FIG. 9 to detect the actual print position, first, the image reading unit 45 outputs, as shown in FIG. 8, a start pulse (START PLS) 46, which is a scan start signal to be output for each main scan. An image read output 47 is transmitted from the image reading unit 45 to the comparator 49. The comparator 49 compares the image read output 47 with a threshold voltage Vth received from the threshold voltage Vth generator 48, and binarizes the comparison results. The obtained binary signal is transmitted as the main scan distance signal 2 to the main scan distance dk measuring circuit 3.

In the main scan distance dk measuring circuit 3, the main scan distance signal 2 and the start pulse (START PLS) 46 are received by the AND circuit 50. The AND circuit 50 transmits a clear signal (clr signal) 51 to the counter 53 each time the main scan distance signal 2 at level H or the start pulse (START PLS) 46 is received. Until the next clear signal clr is transmitted by the AND circuit 50, the counter 53 counts a counter clock generated by the CLK 52 and outputs a count value 54. For example, the count value from the input of the start pulse (START PLS) to the input of the main scan distance signal 2 at level H is the initial period count value that corresponds to a distance from the printing reference position to the actual print position of the first pixel, i.e., the length of the segment 0 in the main scan direction. The count value 54 of the counter 53 is transmitted to the averaging circuit 55, and the averaging circuit 55 obtains the average for the individual count values 54 obtained for the individual main scans until the main scan reading has been repeated a predetermined number of times, i.e., the start pulse (START PLS) 46 has been received a predetermined number of times. The averaging process performed by the averaging circuit 55 is performed in order to suppress an error in the image reading unit 45, and arbitrary times may be employed for the performance of the averaging process. The averaged count values 56 are stored in the main scan period storing circuit 57.

Among the averaged count values 56 stored in the main scan period storing circuit 57, the initial period count value is corrected by the initial period correcting circuit 58 in order to correct the printing timing relative to the scan start timing for the image reading unit 45. This is because there is a phase difference between the start pulse (START PLS) 46 used by the main scan period dk measuring circuit 3 and the BD signal 29 used to determine the printing position.

The averaged count value 56 stored in the main scan period storing circuit 57 is output to the switch SW as the main scan distance measurement signal 4. When the main scan distance measurement signal 4 is for the initial period, i.e., the segment 0 is transmitted to the switch SW, the switch SW is changed in accordance with the modulated clock control signal 33 received from the image clock generating unit 17, so that the main scan distance measurement signal 4 for the initial period is transmitted to the initial error ratio γ0 calculating circuit 7. When the main scan distance measurement signal 4 for another segment is transmitted to the switch SW, the switch SW is changed in accordance with the modulated clock control signal 33 received from the image clock generating unit 17, so that the main scan distance measurement signal 4 for this segment is transmitted to the error ratio γk calculating circuit 13.

As is described above, according to this embodiment, a reference image (shown in FIG. 9) is read, and an inter-pixel distance (the main scan distance measurement signal 4) is measured that corresponds to each of the segments of the reference image. The error ratio γk of each obtained inter-pixel distance to the ideal inter-pixel distance is calculated, and the variable-magnification coefficient αk, which corresponds to the obtained error ratio γk, is changed. Therefore, the print ratio can be accurately corrected, and a superior printing quality can be obtained.

All or part of the blocks constituting the main scan magnification correcting circuit (except for the image reading unit 45 of the main scan distance dk detecting circuit 1) may be provided as an ASIC or another integrated circuit.

(Explanation for Re-Correction)

Figure 14:
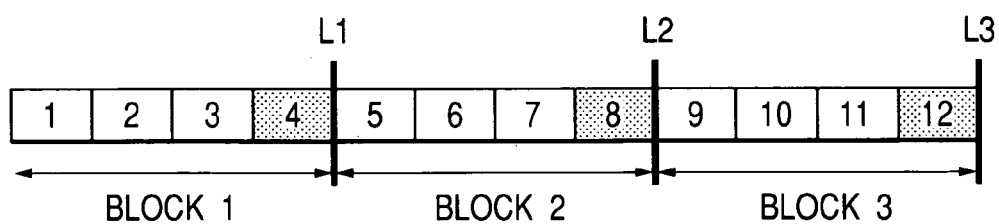
FIG. 14 is a diagram for explaining segments that are divided into blocks.
Figure 15:
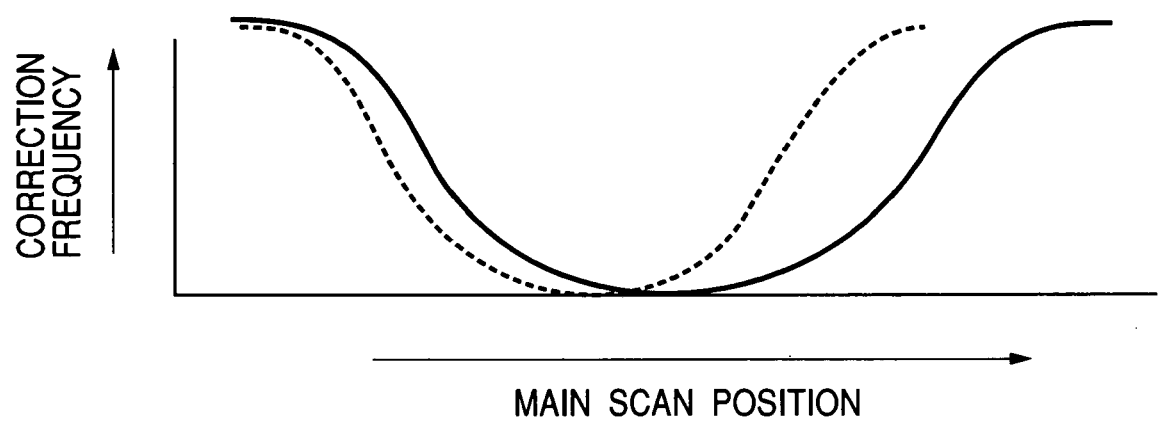
FIG. 15 is a diagram showing the state wherein the f-θ characteristic curve is shifted.

As is shown in FIG. 14, the positions of output print patterns L1, L2, L3, . . . are detected (a BD sensor is provided at the print pattern irradiation position, and as an optical sensor or a CIS arranged in the apparatus is employed to read the print pattern, or the printed paper is read by a scanner), and a distance between the actual print position and the ideal position is obtained. Then, only the re-corrected value for a predetermined segment of each block is stored in the RAM, and the values set for the other segments are stored as fixed values in a non-rewritable ROM.

A second embodiment for performing re-correction will now be described while referring to FIG. 16. Actually, a block is formed of 100 or more segments. However, to simplify the explanation, one block is formed of twelve segments. The twelve segments are divided every four segments to form groups, and print patterns L1r, L2r and L3r are printed on paper and read by a scanner. Based on the obtained image data, the positions of the print patterns are detected while referring to the reference position (main scan start position), and shift distances h1, h2 and h3 from ideal values L1, L2 and L3 are obtained. Further, a shift distance (or shift amount) hn–n (n–1) for each block is calculated. In the example in FIG. 16, the following distances are obtained.

shift distance in block 1=h1
shift distance in block 2=h2–h1
shift distance in block 3=h3–h2

By using the shift distance (or shift amount) for each block and the image clock modulation method described above, modulation coefficients are re-calculated only for adjustment target segments 4, 8 and 12, which are last segments of the individual blocks, and are again stored in the RAM. When the scan velocities of the segments are V4, V8 and V12, the frequencies before adjustment are f4, f8 and f12, and the frequencies after adjustment are f′4, f′8 and f′12, $f'4 = f4 + V4/h1$ $f'8 = f8 + V8/(h2-h1)$ $f'12 = f12 + V12/(h3-h2)$ Thereafter, the adjusted values are employed for the frequency modulation. While the full capacity of the RAM used to store the setup values for all twelve segments is required, according to the second embodiment, the memory capacity can be reduced to ¼ to store the setup values for only three segments. Furthermore, since the frequencies can be independently adjusted for the individual blocks, a complicated algorithm is also not required.

Further, for the position detection in this example, the print pattern is output to paper; however, a print pattern formed on the photosensitive drum may be detected. In addition, the number of segments for each block may not be equal, e.g., block 1: segments 1 to 6, block 2: segments 7 and 8, and block 3: segments 9 to 12.

The re-correction process for a third embodiment will now be described while referring to FIG. 17. The arrangement of the blocks and the calculation of the shift distance are performed in the same manner as in the first embodiment.

shift distance in block 1=h1
shift distance in block 2=h2–h1
shift distance in block 3=h3–h2

In this embodiment, for each block, there are a plurality of segments to be adjusted. In FIG. 17, two segments in each block are to be adjusted as follows.

target segments in block 1: 3 and 4
target segments in block 2: 7 and 8
target segments in block 3: 11 and 12

The following two methods are used to calculate the adjustment values.

2-1) Calculation of different values for individual segments to be adjusted

When the scan velocities of the segments are V3, V4, V7, V8, V11 and V12, and the frequencies before adjustment are f3, f4, f7, f8, f11 and f12 and the frequencies after re-adjustment are f'3, f'4, f'7, f'8, f'11 and f'12, the adjusted frequencies are obtained as follows by an equal distribution of the shift distances.

$$f'3 = f3 + V3/(h1/2)$$

$$f'4 = f4 + V4/(h1/2)$$

$$f'7 = f7 + V7/\{(h2-h1)/2\}$$

$$f'8 = f8 + V8/\{(h2-h1)/2\}$$

$$f'11 = f11 + V11/\{(h3-h2)/2\}$$

$$f'12 = f12 + V12/\{(h3-h2)/2\}$$

According to this method, the amount of absorption of the shift distance after correction can be dispersed.

2-2) Calculation of the same value for adjustment target segments in each block

According to this method, the same value is set for the target segments in each block. That is, f'3=f'4 and f'7=f'8 and f'11=f'12, and the frequencies after adjustment can be obtained by averaging the scan velocities.

$$f'3 = f'4 = f3 + \{(V3+V4)/2\}/h1$$

$$f'7 = f'8 = f7 + \{(V7+V8)/2\}/\{(h2-h1)/2\}$$

$$f'11 = f'12 = f11 + \{(V11+V12)/2\}/\{(h3-h2)/2\}$$

According to this method, the capacity of the RAM can be reduced even more, while the shift distance can be dispersed.

According to the present invention, the variation unique to the f-θ lens can be re-corrected. Further, since only a small number of segments must be readjusted, the processing and the algorithm can be simplified by employing a memory having a small capacity.

Figure 18:
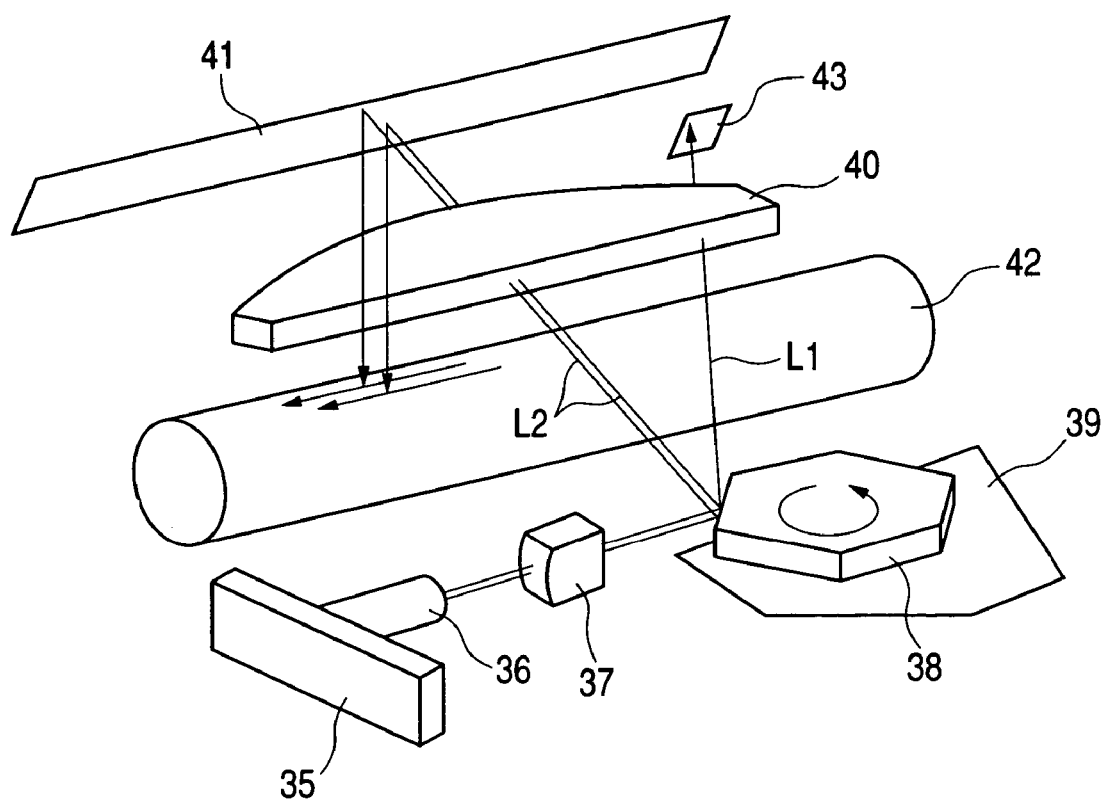
FIG. 18 is a specific diagram showing the arrangement of a multi-beam optical scan unit provided for an image forming apparatus according to a fourth embodiment of the present invention.

FIG. 18 is a specific diagram showing the arrangement of a multi-beam optical scan unit according to a fourth embodiment. In the following explanation, two beams are employed.

As is shown in FIG. 18, the optical scan unit includes a laser driving circuit 35 and a laser unit 36 driven by the laser driving circuit 35. The laser unit 36 is constituted by a semiconductor laser (not shown) that can emit two laser beams at the same time and a collimator lens (also not shown). The laser driving circuit 35 receives an image signal and an image clock that will be described later, and drives the semiconductor laser based on the image signal and the image clock.

In a non-image area, two laser beams L1 emitted by a laser unit 36 pass through a cylindrical lens 37 and reach a polygon mirror 38 that is rotated at a uniform angular velocity by a scanner motor unit 39. The laser beams that reach the polygon mirror 38 are deflected by the polygon mirror 38, and the deflected laser beams L1 then enter an f-θ lens 40. The laser beams L1 that have entered the f-θ lens 40 are converted into laser beams that scan at a uniform speed in the direction perpendicular to the rotation direction of a photosensitive drum 42. The obtained laser beams L1 are received by a beam detecting sensor (BD sensor) 43.

In an image area, in addition to the laser beams L1, two laser beams L2 enter the f-θ lens 40 and are converted into laser beams that scan at a uniform speed in the direction perpendicular to the rotation direction of the photosensitive drum 42. The obtained laser beams L2 are reflected by a reflection mirror 41, and the reflected beams are projected onto the photosensitive drum 42. Through the irradiation by these beams, an electrostatic latent image is formed on the photosensitive drum 42, and a toner image is visualized by the application of toner. The toner image is then transferred and fixed to a recording medium. Through this processing sequence, an image is formed on the recording medium, and the recording medium is thereafter discharged outside the apparatus.

Figure 19:
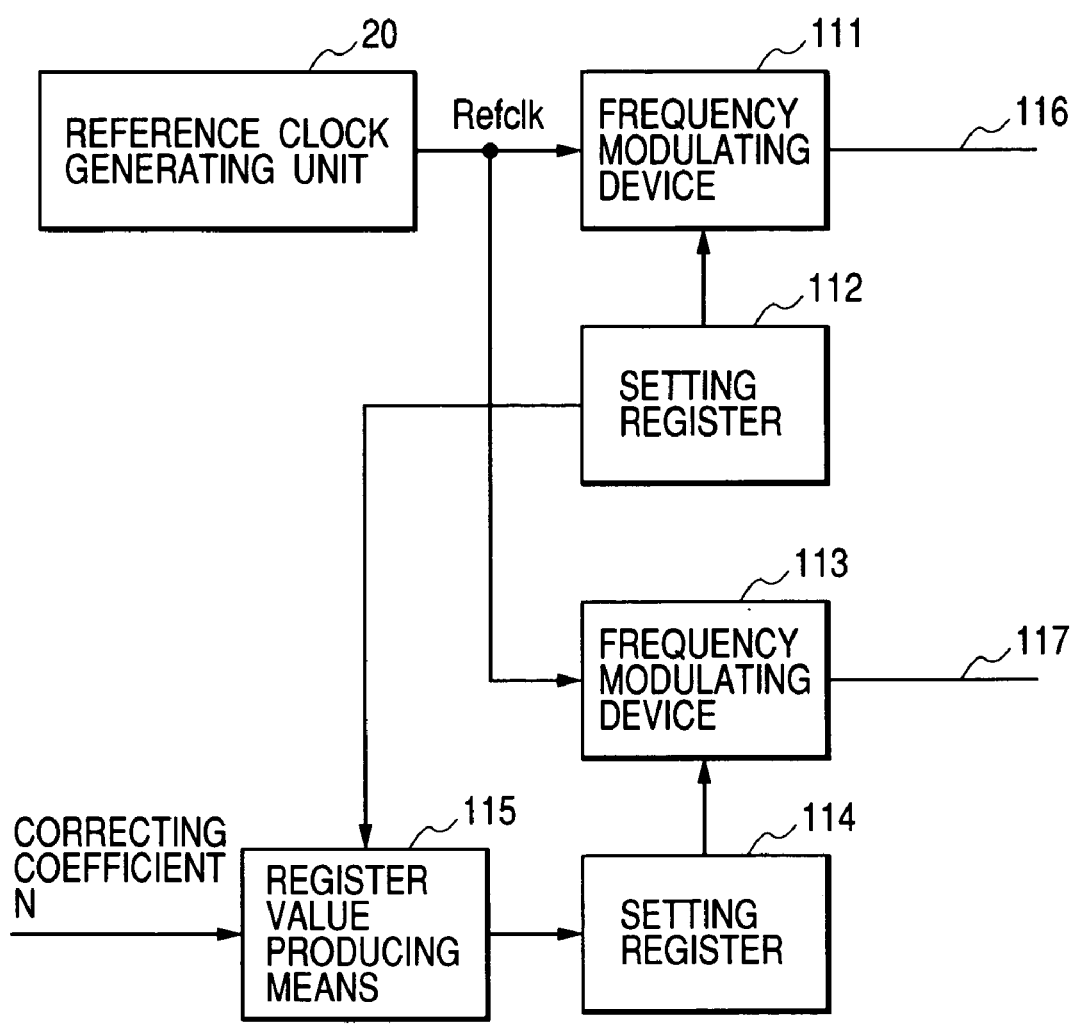
FIG. 19 is a block diagram showing a frequency modulation configuration for generating an image clock signal to be supplied to a laser driving circuit in FIG. 18.

A frequency control device for generating an image clock signal to be supplied to the laser driving circuit 35 will now be described while referring to FIG. 19. FIG. 19 is a block diagram showing a frequency modulation configuration for generating an image clock signal to be supplied to the laser driving circuit 35 in FIG. 18. In this explanation, a modulation frequency configuration for generating image clock signals for multi-beams (two beams) is employed.

As is shown in FIG. 19, the frequency modulation configuration for this embodiment includes two setting registers 112 and 114 and two frequency modulating devices 111 and 113 in order to generate image clock signals 116, 117 in consonance with two laser beams. The setting registers 112 and 114 are provided at a preceding stage, and transmit, to variable-magnification coefficient setting registers 51 that are provided for the frequency modulation devices 111 and 113 and that will be described later, setup values (variable-magnification coefficients) for one line in the main scan direction, or for the number of segments in the line. The frequency modulating devices 111 and 113 generate image clocks 116 and 117 based on a reference clock signal Refclk generated by a reference clock generating unit 20, and the setup values (variable-magnification coefficients) received from the corresponding setting registers 112 and 114. The detailed structures and the operations of the frequency modulating devices 111 and 113 will be described later.

A reference table for a first laser beam is held in the setting register 112. As will be described later, variable-magnification coefficients, which are multipliers for varying the period ratio for a reference clock signal 21, are entered in this reference table. A sub-table for a second laser beam is held in the setting register 114, and values entered to this sub-table are those that are generated by a register value producing unit 115 based on the value in the reference table stored in the setting register 112 and a predesignated correction coefficient N.

The register value producing unit 115 employs a predetermined data conversion method for preparing the sub-table, but not the reference table. The data conversion method will now be described while referring to FIGS. 21A to 21D. FIGS. 21A to 21D are diagrams for explaining data conversion methods used by the register value producing unit 115.

There are four predetermined data conversion methods used by the register value producing unit 115 to generate a sub-table. When a sub-table can not be generated by one of the conversion methods based on the value of the reference value and the predesignated correction coefficient N, some of these conversion methods are jointly employed to perform data conversion.

Figure 21A:
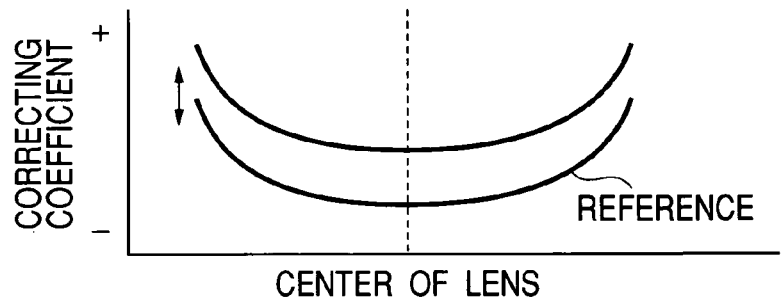
FIGS. 21A, 21B, 21C and 21D are diagrams for explaining data conversion methods used by a register value producing unit.
Figure 21B:
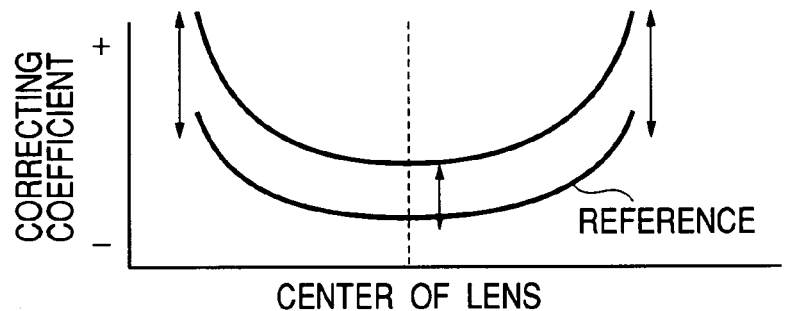
Figure 21C:
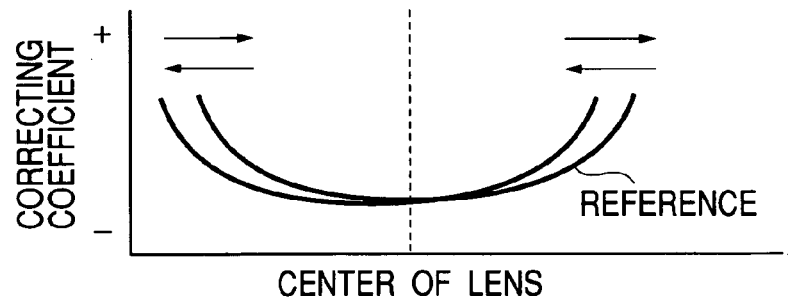
Figure 21D:
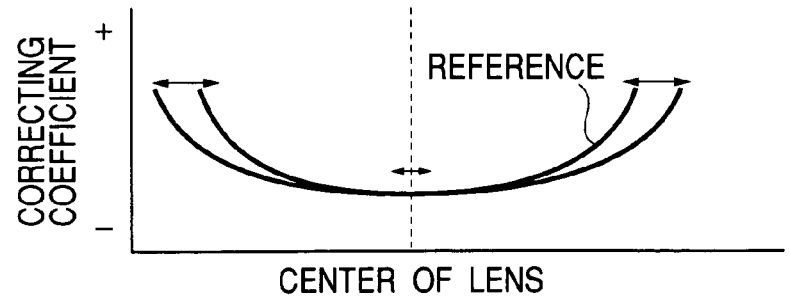

Specifically, a first conversion method is a method for adding a predetermined value corresponding to the correction coefficient N to the variable-magnification coefficient of the reference table, or for subtracting the predetermined value from the variable-magnification coefficient (see FIG. 21A). A second conversion method is a method for multiplying the variable-magnification coefficient of the reference table by a predetermined value corresponding to the correction coefficient N (see FIG. 21B). A third conversion method is a method for shifting the variable-magnification coefficient of the reference table to the right or left, in the main scan direction, by a distance equivalent to a predetermined value corresponding to the correction coefficient N (see FIG. 21C). A fourth conversion method is a method whereby, in consonance with the correction coefficient N, the variable-magnification coefficient in the reference table is adjusted in the direction leading toward a correction position, centering on the middle of the f-θ lens (see FIG. 21D).

A feature of the frequency characteristic is that among the same lenses a similar conversion method is employed that is based on the reference table.

Figure 20:
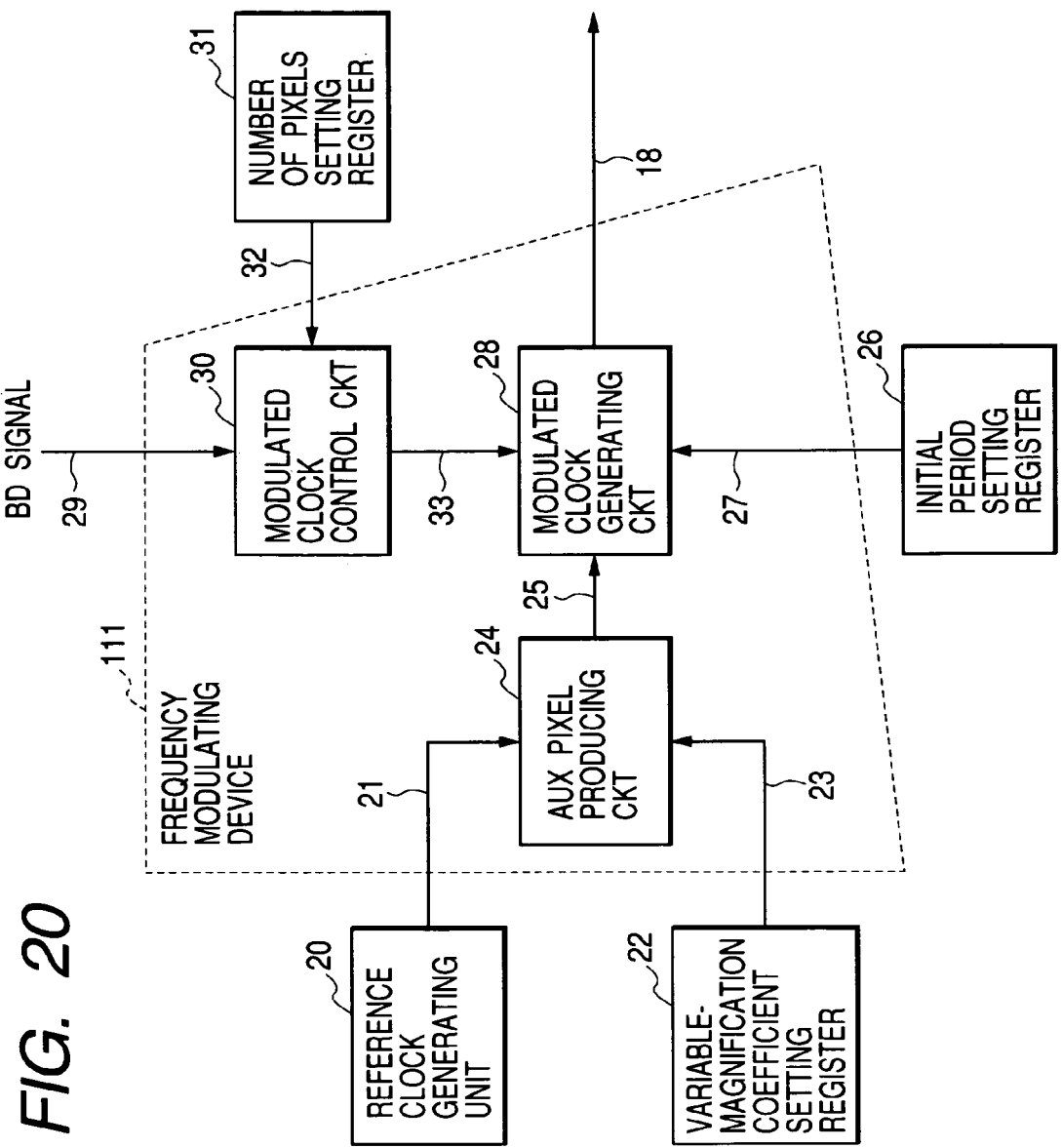
FIG. 20 is a block diagram showing the structures of frequency modulating devices in FIG. 19.

The structure for the frequency modulating devices 111 and 113 will now be described while referring to FIG. 20. FIG. 20 is a block drawing showing the structure for the frequency modulating devices 111 and 113 in FIG. 19. Since the frequency modulating devices 111 and 113 have the same structure, only the structure for the frequency modulating device 111 will be explained.

The frequency modulating device 111 performs frequency modulation for a predesignated image clock signal. The frequency modulating device 111 includes a reference clock generating unit 20, a variable-magnification coefficient setting register 22, an auxiliary pixel producing circuit 24, an initial period setting register 26, a modulated clock control circuit 30, a number of pixels setting register 31 and a modulated clock generating circuit 28.

The reference clock generating unit 20 generates a reference clock signal 21 having an arbitrary frequency. A variable-magnification coefficient 23, used to vary the period ratio for the reference clock signal 21, is held in the variable-magnification coefficient setting register 22.

The auxiliary pixel producing circuit 24 produces an auxiliary pixel period 25 based on the reference clock signal 21 and the variable-magnification coefficient 23. When the period for the reference clock signal 21 is, for example, τref, the variable-magnification coefficient 23 is αk and the auxiliary pixel period 25 is Δτ. Δτ is represented by the following equation (1).

$$\Delta\tau = \alpha k \cdot \tau ref \quad (1)$$

wherein the variable-magnification coefficient 23 (αk) is set to such a value that the auxiliary pixel period 25 (Δτ) is sufficiently shorter than the period for an image clock 18 (corresponding to the image clock 16 or 17 in FIG. 2).

An initial value 27 (τvdo) for the period for the image clock 18 (corresponding to the image clock 16 or 17 in FIG. 2) is held in the initial period setting register 26.

The modulated clock control circuit 30 divides one line in the main scan direction into a plurality of segments each of which is constituted by an arbitrary number of pixels. The modulated clock control circuit 30 controls the image clock period between the segments, or within each segment. The number of pixels in the segment is designated as a pixel count setup value 32 stored in the number of pixels setting register 31. A different number of pixels or the same number of pixels may be employed for the individual segments.

Since the operation of the modulated clock control circuit 30 is the same as that in FIGS. 5A and 5B, no detailed explanation for this will be given.

Under the control of the modulated clock control circuit 30, the image clock 18 having a plurality of periods within one scan line is output by the modulated clock producing circuit 28.

As is described above, according to this embodiment, for each laser beam, the main scan line is divided into a plurality of segments, and for each segment, the frequency of an image clock is changed based on the value in the reference table or the sub-table. Since the frequency modulation for the image clock is performed in this manner, the misregistration and positioning shift caused by a color image forming apparatus can be suppressed. As a result, a high quality color image can be output.

Further, in accordance with the characteristic f-θ lens 40, one or some of the four data conversion methods, i.e., addition and subtraction, multiplication, shifting of a correction position and the magnification adjustment performed for a correction position, centering on the middle of the lens, are employed, and a sub-table (correction table) for the second beam is generated based on the reference table for the first beam. Therefore, the correction operation can be simplified.

Figure 22:
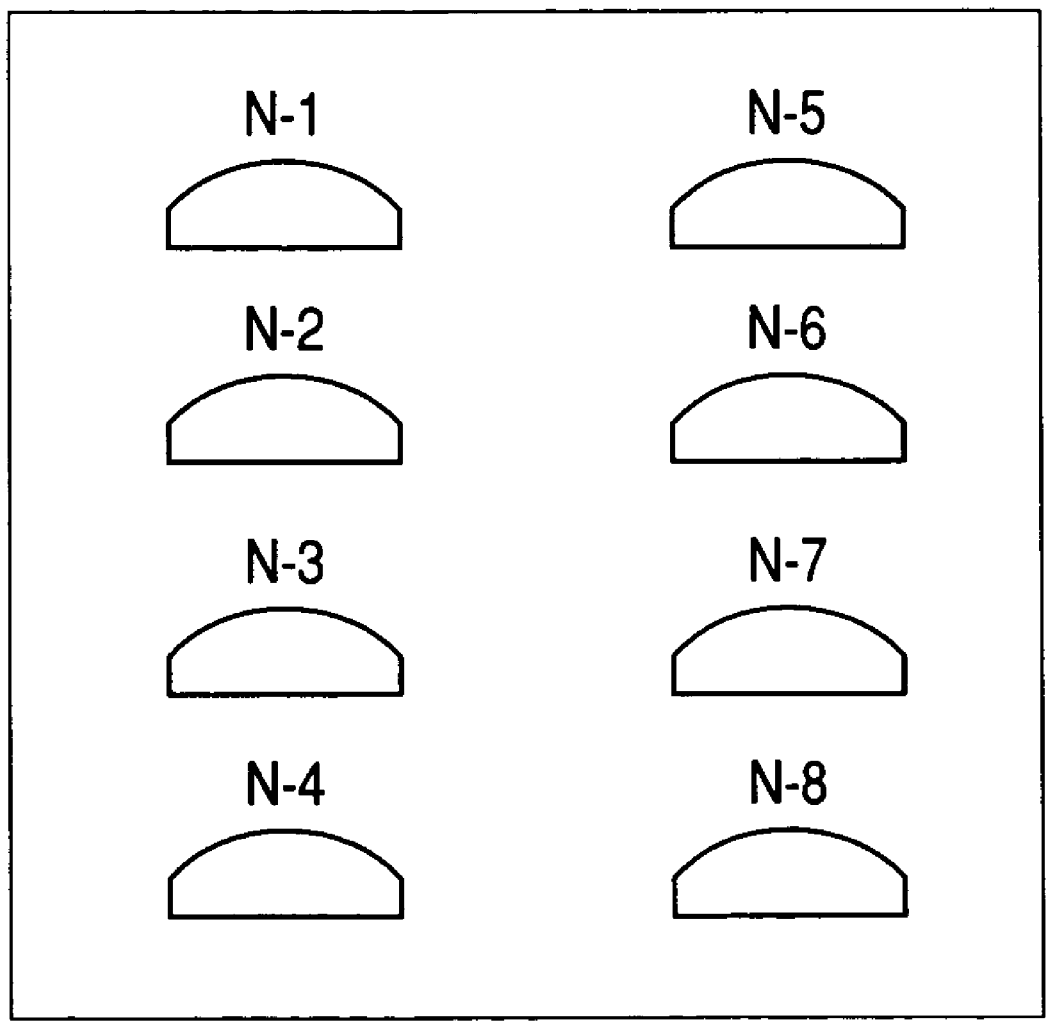
FIG. 22 is a specific diagram showing the structure of an f-θ lens manufactured using multi-shots.
Figure 23:
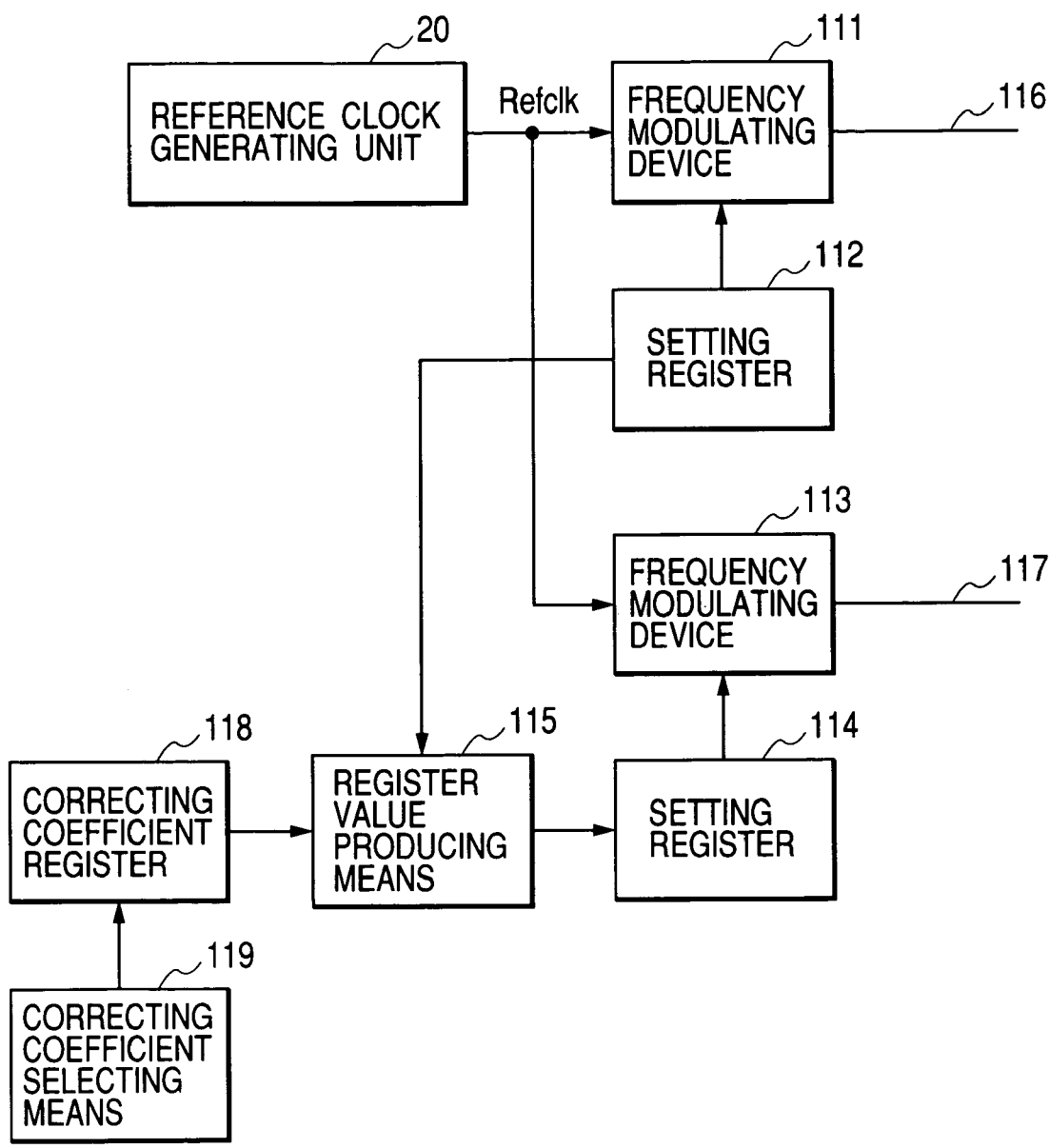
FIG. 23 is a block diagram showing a frequency modulation configuration according to a fifth embodiment of the present invention.

A fifth embodiment of the present invention will now be described while referring to FIGS. 22 and 23. FIG. 22 is a specific diagram showing the structure of an f-θ lens by multi-shots, and FIG. 23 is a block diagram showing a frequency modulation configuration according to the fifth embodiment of the invention. In FIG. 23, the same reference numerals are used to denote blocks having the same functions as the blocks in FIG. 19, and no explanation for them will be given.

Generally, a lens having superior accuracy can be generated using glass, but glass is expensive. On the other hand, a lens made of plastic is appropriate for practical use, even though the accuracy is lowered, because plastic is less expensive than glass. Therefore, as is shown in FIG. 22, the f-θ lens tends to be manufactured using a plurality of molds N-1 to N-8 (multi-shots). When the f-θ lens is produced by multi-shots, the rough characteristic of the f-θ lens can be obtained and managed based on the mold number. In this embodiment, this advantage is employed.

In this embodiment, as is shown in FIG. 23, correction coefficients corresponding to the mold numbers N-1 to N-8 in FIG. 22 are stored in a correction coefficient register 118. Among the correction coefficients stored in the correction coefficient register 118, a correction coefficient corresponding to a mold number is selected by a correction coefficient selecting unit 119, and is transmitted to a register value producing unit 115. Therefore, a correction table for a second beam can be easily prepared in consonance with a mold, and an image clock 117 is generated by using the correction table.

Figure 24:
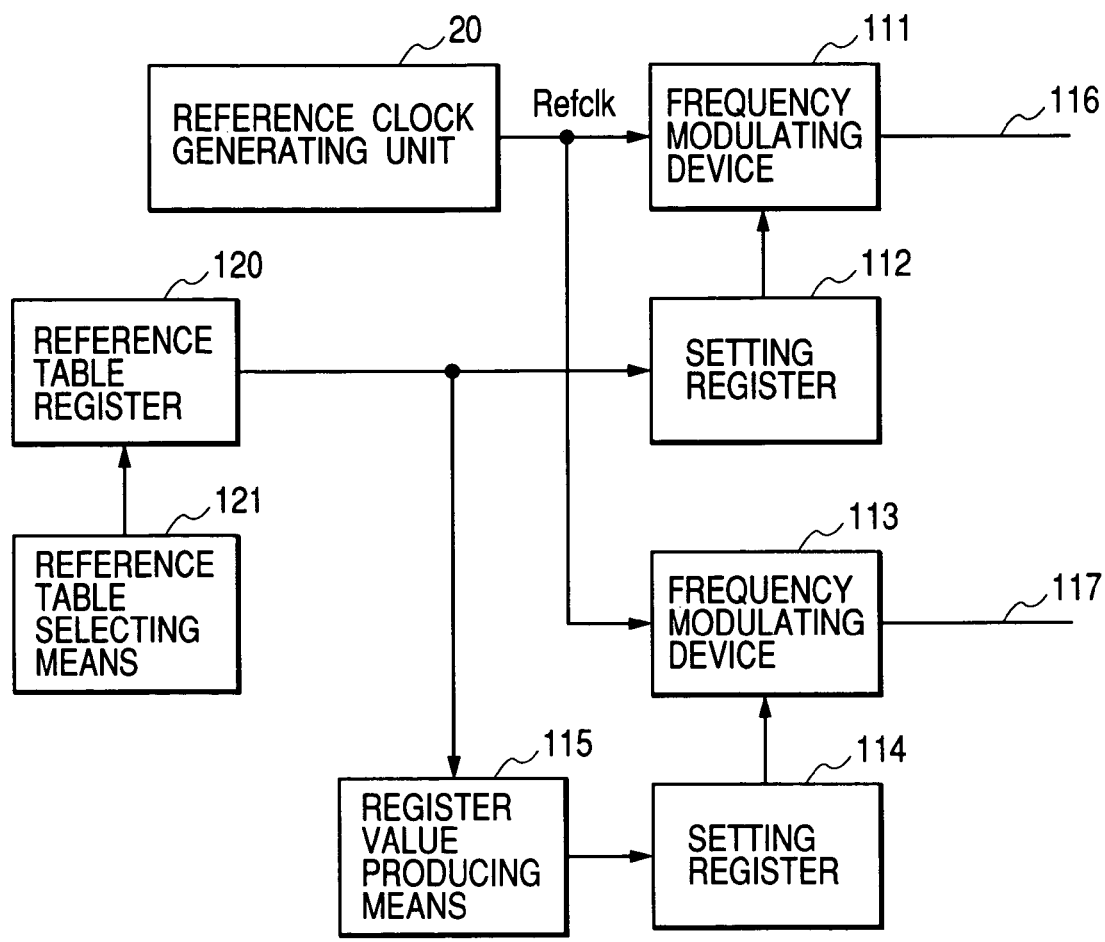
FIG. 24 is a block diagram showing a frequency modulation configuration according to a sixth embodiment of the present invention.
Figure 25:
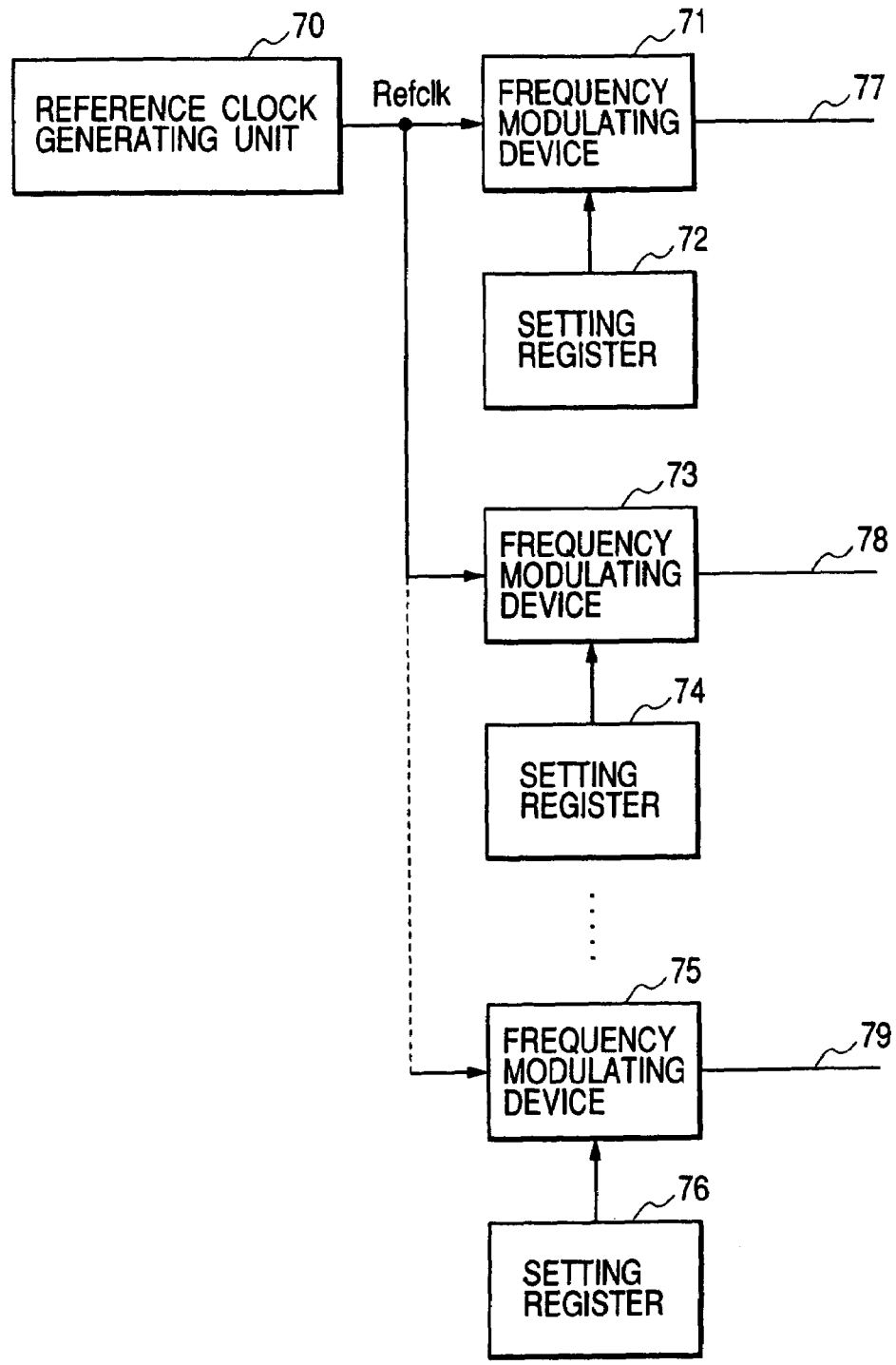
FIG. 25 is a block diagram showing a frequency modulation configuration for a conventional image forming apparatus constituted by a multi-beam laser.

A sixth embodiment of the present invention will now be described while referring to FIG. 24. FIG. 24 is a block diagram showing a frequency modulation configuration according to the sixth embodiment of this invention. The same reference numerals are used to denote blocks having the same functions as the blocks in FIG. 2, and no explanation for them will be given.

While in the fifth embodiment a correction coefficient is selected in consonance with a mold (a multi-shot), in this embodiment, reference tables used to perform corrections in consonance with the f-θ characteristics for a first beam are managed for the individual mold numbers, and a reference table is selected in accordance with a mold number.

That is, in this embodiment, as is shown in FIG. 24, reference tables for individual molds are stored in a reference table register 120, and a reference table corresponding to a mold number is selected by a reference table selecting unit 121. Therefore, the correction operation consonant with the f-θ characteristics of a first beam can be simplified.

In the fifth embodiment and the sixth embodiment, an explanation has been given for the method whereby the mold for the multi-shot lens is employed to correct the image clock in consonance with the characteristics of the f-θ lens. It is also very effective when these two methods are employed together.

The configuration including all the blocks constituting the frequency modulating devices, or the configuration including a part of these blocks, or the configuration including blocks on in the periphery may be provided as an ASIC or another integrated circuit.

What is claimed is:

1. A frequency modulation apparatus comprising:
   a segmentalizing device for dividing, into a plurality of segments in units of pixel, a main scan line on an image bearing member scanned by a laser beam;
   an auxiliary clock calculation device for employing a reference clock period, and variable-magnification coefficients corresponding to the respective segments, to calculate auxiliary clock periods for the respective segments;
   an image clock generating device for generating image clocks for the respective segments based on an initial predesignated period value and the auxiliary clock periods for the respective segments;
   a reference value storing device for storing a reference value;
   a detecting device for detecting a difference between the reference value and an actual laser irradiation location; and
   a correcting device for correcting a shift in the laser irradiation location in accordance with the detection results obtained by the detecting device,
   wherein the detecting device separates the segments into blocks of continuous segments, and detects a shift between a laser irradiation position based on a value predesignated for each of the blocks and an actual laser irradiation position; and
   wherein, in accordance with the detection results obtained by the detecting device, the correcting device controls a pixel period of the segment, and corrects the shift of the laser irradiation position.

2. A frequency modulation apparatus according to claim 1, wherein segment(s) fewer than the segments constituting each of the blocks are defined as segment(s) to be adjusted; and
   wherein the correcting device controls the pixel period for the segment to be adjusted, and corrects an error for the laser irradiation position.

3. A frequency modulation apparatus according to claim 1, wherein the segment to be adjusted is the last segment for each of the blocks of the segments.

4. A frequency modulation apparatus according to claim 1, wherein, for each of the blocks, the same value is set for the segment(s) to be adjusted.

5. A frequency modulation apparatus according to claim 1, wherein an inflection point along an f-θ lens characteristic curve is employed to separate the segments into the blocks.

* * * * *

UNITED STATES PATENT AND TRADEMARK OFFICE
CERTIFICATE OF CORRECTION

PATENT NO. : 7,129,967 B2
APPLICATION NO. : 10/789997
DATED : October 31, 2006
INVENTOR(S) : Yuichi Seki et al.

It is certified that error appears in the above-identified patent and that said Letters Patent is hereby corrected as shown below:

COLUMN 9:
Line 24, "$2 \geq k \geq m \geq 256$" should read -- $2 \leq k \leq m \leq 256$ --.

COLUMN 10:
Line 26, "$\tau seg1 = \tau ref \cdot \alpha 1' = \gamma 1 \tau vdo$" should read -- $\tau seg1 = \tau ref \cdot \alpha 1' = \gamma 1 \cdot \tau vdo$ --.

COLUMN 18:
Lines 27, 30 and 33, "1," should read -- 2, --.

Signed and Sealed this

Twenty-fourth Day of April, 2007

JON W. DUDAS
*Director of the United States Patent and Trademark Office*